(12) United States Patent
Yamaguchi

(10) Patent No.: US 8,737,726 B2
(45) Date of Patent: May 27, 2014

(54) IMAGE DATA PROCESSING DEVICE, METHOD, PROGRAM AND INTEGRATED CIRCUIT

(75) Inventor: Koichiro Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 95 days.

(21) Appl. No.: 13/578,392

(22) PCT Filed: Jan. 24, 2012

(86) PCT No.: PCT/JP2012/000410
§ 371 (c)(1),
(2), (4) Date: Aug. 10, 2012

(87) PCT Pub. No.: WO2012/102015
PCT Pub. Date: Aug. 2, 2012

(65) Prior Publication Data
US 2013/0004064 A1    Jan. 3, 2013

(30) Foreign Application Priority Data

Jan. 28, 2011 (JP) ................................. 2011-016483

(51) Int. Cl.
*G06K 9/46* (2006.01)

(52) U.S. Cl.
USPC ........... 382/164; 382/195; 382/202; 382/190; 382/224; 382/162

(58) Field of Classification Search
CPC .......... H04N 5/23219; G06K 9/00234; G06K 9/6256; G06K 9/46; G06K 9/00221; G06F 17/30247
USPC ......... 382/115, 118, 164, 167, 190, 195, 224, 382/275, 202; 348/222.1, 207.1, 239, 231.3
See application file for complete search history.

(56) References Cited

U.S. PATENT DOCUMENTS

| 7,508,961 B2 * | 3/2009 | Chen et al. ..................... 382/118 |
| 2005/0134946 A1 | 6/2005 | Tsue et al. |

(Continued)

FOREIGN PATENT DOCUMENTS

| JP | 2005-184790 | 7/2005 |
| JP | 2007-129434 | 5/2007 |

(Continued)

OTHER PUBLICATIONS

International Search Report issued Apr. 17, 2012 in International (PCT) Application No. PCT/JP2012/000410.

*Primary Examiner* — Ali Bayat
(74) *Attorney, Agent, or Firm* — Wenderoth, Lind & Ponack, L.L.P.

(57) ABSTRACT

When photographing images including a person's face at an event, photographers tend to photograph images so that features of the event appear in a region around the person's face. An image data processing device of the present invention extracts image feature information so that an image feature calculated based on pixels in the region around the person's face, which tends to represent features of an event, is reflected more than that calculated based on pixels in a region remote from the person's face, which tends not to represent features of an event. This allows the image data processing device to calculate image feature information reflecting features of an event more than that calculated by a conventional image data processing device. The image data processing device therefore improves classification precision compared to the conventional device when classifying images using the image feature information calculated by the image data processing device.

14 Claims, 23 Drawing Sheets

(56) References Cited

U.S. PATENT DOCUMENTS

2007/0103565 A1    5/2007   Xu et al.
2007/0195995 A1*   8/2007   Matsumoto et al. .......... 382/103
2012/0032960 A1    2/2012   Kameyama
2012/0170856 A1*   7/2012   Yamaguchi .................. 382/224
2012/0213421 A1*   8/2012   Chien .......................... 382/118

FOREIGN PATENT DOCUMENTS

| | | |
|---|---|---|
| JP | 2007-317077 | 12/2007 |
| JP | 4232774 | 3/2009 |
| JP | 4315344 | 8/2009 |
| JP | 2010-273328 | 12/2010 |

* cited by examiner

FIG. 6

| Image ID | Face feature 600 | | | Body feature | | | |
|---|---|---|---|---|---|---|---|
| | Face ID 611 | Face area 612 | Face position 613 | Corresponding face ID 614 | Body ID 621 | Body area 622 | Body position 623 |
| 0001 | 0001 | 0.10 | (10.0, 10.0), (30.0, 30.0) | 01 | 0001 | 0.30 | (5.0, 30.0), (35.0, 70.0) |
| 0002 | 0002 | 0.05 | (50.0, 50.0), (60.0, 60.0) | 02 | 0002 | 0.15 | (47.5, 60.0), (52.5, 80.0) |
| 0003 | 0003 | 0.10 | (10.0, 10.0), (30.0, 30.0) | 01 | 0003 | 0.30 | (5.0, 30.0), (35.0, 70.0) |
| 0004 | 0004 | 0.05 | (50.0, 50.0), (60.0, 60.0) | 02 | 0004 | 0.15 | (47.5, 60.0), (52.5, 80.0) |
| | 0005 | 0.05 | (70.0, 50.0), (80.0, 60.0) | 99 | 0005 | 0.15 | (67.5, 60.0), (72.5, 80.0) |
| ... | ... | ... | ... | ... | ... | ... | ... |

To bottom left → From top right

| Face around region 630 | Body around region 640 | Person around feature 650 | | |
|---|---|---|---|---|
| | | Black 651 | Blue 652 | Green 653 | White 654 |
| (5.0, 5.0), (35.0, 35.0) | (0.0, 22.5), (42.5, 77.5) | 0.1 | 0.2 | 0.1 | 0.6 |
| (47.5, 47.5), (62.5, 62.5) | (42.5, 55.0), (57.5, 85.0) | 0.1 | 0.2 | 0.1 | 0.6 |
| (5.0, 5.0), (35.0, 35.0) | (0.0, 22.5), (42.5, 77.5) | 0.1 | 0.5 | 0.1 | 0.3 |
| (47.5, 47.5), (62.5, 62.5) | (42.5, 55.0), (57.5, 85.0) | 0.1 | 0.5 | 0.1 | 0.3 |
| (67.5, 47.5), (72.5, 62.5) | (62.5, 55.0), (77.5, 85.0) | | | | |
| ... | ... | ... | ... | ... | ... |

FIG. 7

| Image ID | Face ID | Corresponding face ID | Image family scene feature | | | |
|---|---|---|---|---|---|---|
| | | | Black | Blue | Green | White |
| 0001 | 0001 | 01 | 0.25 | 0.5 | 0.25 | 1.5 |
| 0002 | 0002 | 02 | 0.5 | 1.0 | 0.5 | 3.0 |
| 0003 | 0003 | 01 | 0.25 | 1.25 | 0.25 | 0.75 |
| 0004 | 0004 | 02 | 0.5 | 2.5 | 0.5 | 1.5 |
| | 0005 | 03 | | | | |
| ⋮ | ⋮ | ⋮ | ⋮ | ⋮ | ⋮ | ⋮ |

FIG. 8

| Image group ID | Event name | Image group family scene feature | | | |
|---|---|---|---|---|---|
| | | Black | Blue | Green | White |
| 001 | 2010 winter trip to Shinshu | 0.375 | 0.75 | 0.375 | 2.25 |
| 002 | 2010 summer trip to Okinawa | 0.375 | 1.875 | 0.375 | 1.125 |
| ⋮ | ⋮ | ⋮ | ⋮ | ⋮ | ⋮ |

| Classification condition | Black ratio 1.5 or more | Blue ratio 1.5 or more | Green ratio 1.5 or more | White ratio 1.5 or more | ... |
|---|---|---|---|---|---|
| Classification event | Fireworks | Sea bathing | Picnic | Skiing | ... |

FIG. 15

| Image group ID | Event name | Image group scene feature ||||
|---|---|---|---|---|---|
| | | Black | Blue | Green | White |
| 001 | 2010 winter trip to Shinshu | 0.1 | 0.4 | 0.1 | 0.4 |
| 002 | 2010 summer trip to Okinawa | 0.1 | 0.4 | 0.1 | 0.4 |
| ⋮ | ⋮ | ⋮ | ⋮ | ⋮ | ⋮ |

FIG. 19

| Classification condition /1900 | Black ratio 0.5 or more /1901 | Blue ratio 0.5 or more /1902 | Green ratio 0.5 or more /1903 | White ratio 0.5 or more /1904 | ... |
|---|---|---|---|---|---|
| Classification event /1910 | Fireworks /1911 | Sea bathing /1912 | Picnic /1913 | Skiing /1914 | ... |

IMAGE DATA PROCESSING DEVICE, METHOD, PROGRAM AND INTEGRATED CIRCUIT

TECHNICAL FIELD

The present invention relates to an image data processing device that calculates image feature information for classifying images.

BACKGROUND ART

As digital image photographing apparatuses, such as digital still cameras and mobile phones having a camera function, gain popularity, hard discs and other recording media for recording photographed images have become available inexpensively.

Generally, users of digital image photographing apparatuses and the like (hereinafter simply referred to as users) store photographed images on a recording medium such as a hard disc with a large capacity.

If the number of stored images grows large, users have difficulty searching for a particular image. To facilitate searching, images may be classified into categories. For example, images photographed at an athletic meet are classified into a category "athletic meet."

An example of technology for classifying images is to calculate, from each stored image, image feature information indicating a feature of the image and classify images into categories using the calculated image feature information, as described in Patent Literature 1. Another known form of technology is to classify images using the number of and sizes of faces appearing in each image, as described in Patent Literature 2.

CITATION LIST

Patent Literature

[Patent Literature 1]
Japanese Patent No. 4232774
[Patent Literature 2]
Japanese Patent No. 4315344

SUMMARY OF INVENTION

Technical Problem

Users typically photograph images at events, such as sea bathing or a ski trip. Users also often view images in units of image groups photographed at events.

Therefore, it is desirable to classify images belonging to an image group photographed at one event into the same category.

However, when there are similar image feature information pieces in image feature information pieces extracted from images photographed at different events, it is sometimes difficult to appropriately classify the images into categories.

By way of example, consider a case where images belonging to an image group A photographed at sea bathing and images belonging to an image group B photographed at a ski trip are to be classified using image feature information pieces calculated by a conventional image data processing device based on primary colors (e.g. black, blue, green, white) included in a large part of each image.

Images photographed at sea bathing often include the blue color of the sea and the white color of the sand, and images photographed at a ski trip often include the blue color of the sky and the white color of the snow. Therefore, image feature information calculated by the conventional image data processing device for each image photographed at sea bathing is similar to image feature information calculated by the conventional image data processing device for each image photographed at a ski trip.

In such a case, when images are classified based on the image feature information calculated by the conventional image data processing device, it is difficult to classify images belonging to the image group A photographed at sea bathing and images belonging to the image group B photographed at a ski trip into different categories.

The present invention has been conceived in light of the above problem, and aims to provide an image data processing device that calculates image feature information for classifying images and that, when images are classified using the image feature information calculated by the image data processing device, improves the precision of classification compared to the conventional image data processing device so that images belonging to an image group photographed at one event are classified into the same category.

Solution to Problem

In order to solve the above problem, an image data processing device according to the present invention is an image data processing device that calculates image feature information for classifying images, comprising: a face specification unit configured to specify a face region included in an image; and an image feature calculation unit configured to calculate image feature information for the image from an image feature calculated based on at least some pixels in the image, wherein the image feature information is calculated such that the image feature calculated based on pixels in a given region around the face region is reflected in the image feature information more than the image feature calculated based on pixels other than the pixels in the given region.

Advantageous Effects of Invention

When photographing images each including a person's face at a certain event, photographers tend to photograph images so that the features of the event appear in a region around the person's face. For example, photographers tend to photograph images at sea bathing so that the blue color of the sea appears in a region around a person's face and to photograph images at a ski trip so that the white color of the snow appears in a region around a person's face.

The image data processing device according to the present invention having the above-mentioned configuration extracts the image feature information so that an image feature calculated based on pixels in a region around a person's face, which tends to represent the features of the event, is reflected in the image feature information more than an image feature calculated based on pixels in a region remote from a person's face, which tends not to represent the features of the event. With this configuration, the image data processing device according to the present invention can calculate the image feature information that reflects the features of the event more than that calculated by a conventional image data processing device.

Therefore, the image data processing device according to the present invention improves the precision of classification compared to the conventional image data processing device when images are classified using the image feature information calculated by the image data processing device according to the present invention.

BRIEF DESCRIPTION OF DRAWINGS

FIG. 6 shows a data structure of image feature information.

FIG. 7 shows a data structure of image family scene information.

FIG. 8 shows a data structure of image group family scene information.

FIG. 9 shows a data structure of event feature information.

FIG. 15 shows a data structure of image group scene information generated by a conventional image data processing device.

FIG. 19 shows a data structure of the event feature information.

DESCRIPTION OF EMBODIMENTS

Embodiment 1

As an embodiment of an image data processing device according to the present invention, the following describes an image data processing device 100 that calculates a person around feature indicating a feature of pixels around a person appearing in an image, and, based on the calculated person around feature, classifies images into different classification events determined in advance in units of image groups each including a plurality of images photographed at one event.

In this context, an image group is a collection of a plurality of images designated by a user. Examples of the image group include a collection of images photographed at a trip to Hokkaido in the winter of 2009, or a collection of images photographed at a trip to Okinawa in the summer of 2010. Furthermore, in this context, classification events represent categories into which image groups are classified, and include, for example, a category into which an image group relating to skiing is classified and a category into which an image group relating to sea bathing is classified.

<Configuration>

<Hardware Configuration of Image Data Processing Device 100>

Figure 1:
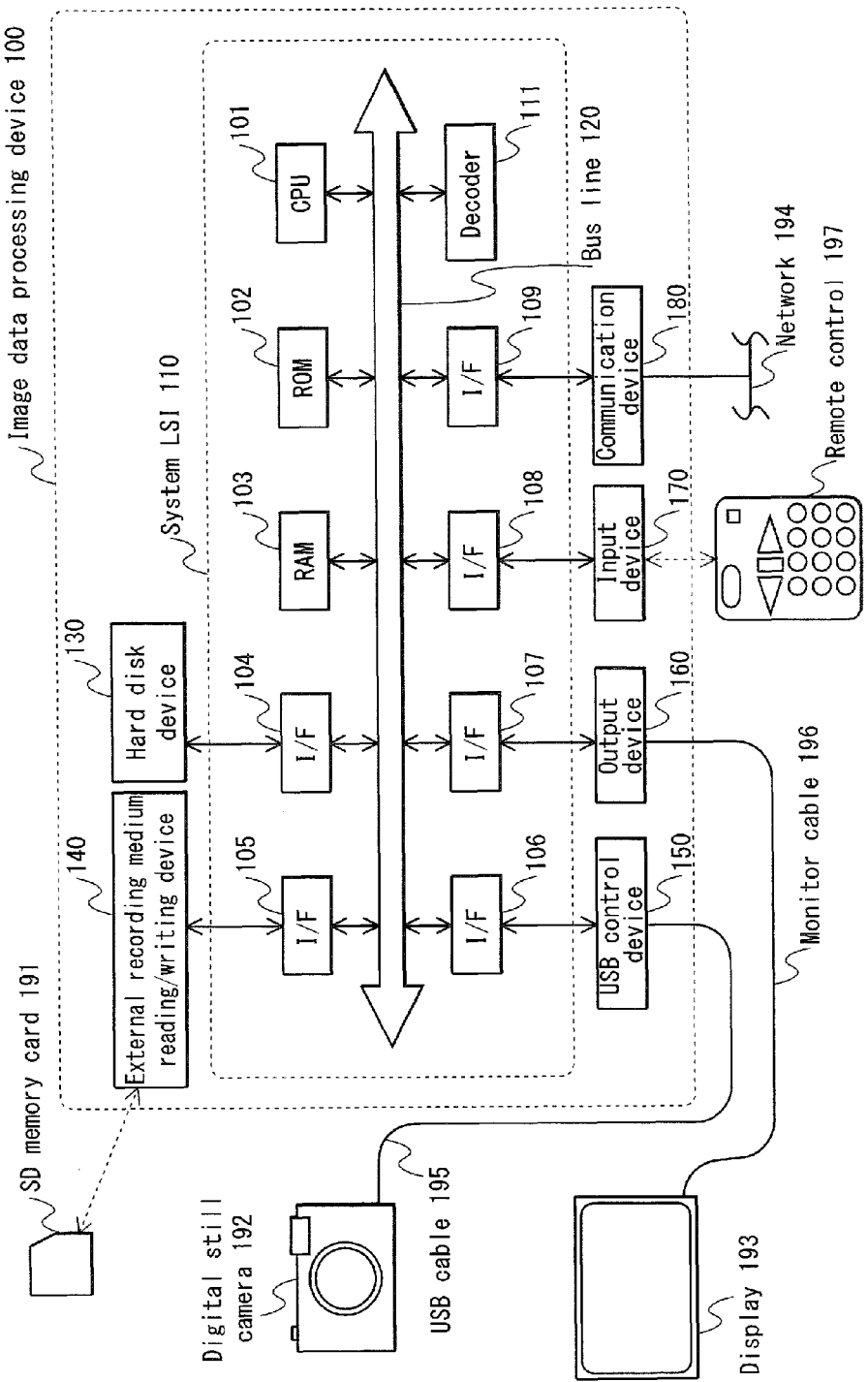
FIG. 1 is a block diagram illustrating a hardware configuration of an image data processing device 100.

FIG. 1 is a block diagram illustrating a hardware configuration of the image data processing device 100.

The image data processing device 100 includes a system LSI (Large Scale Integrated circuit) 110, a hard disk device 130, an external recording medium reading/writing device 140, a USB control device 150, an output device 160, an input device 170 and a communication device 180. The image data processing device 100 stores images, which are digital photographs, as data encoded in the JPEG (Joint Photographic Experts Group) format and classifies the stored images.

Via a removable USB cable 195, the image data processing device 100 connects with a device, typified by a digital still camera 192, which has images recorded thereon. Via a monitor cable 196, the image data processing device 100 connects with a display 193 for displaying images. The image data processing device 100 also connects with a network 194 and communicates wirelessly with a remote control 197 that accepts user operation commands. The image data processing device 100 reads and writes data to and from an external recording medium typified by an SD memory card 191.

The system LSI 110 is an LSI in which the following are combined onto a single integrated circuit: a CPU 101, a ROM 102, a RAM 103, a hard disk device interface 104, an external recording medium reading/writing device interface 105, a USB (Universal Serial Bus) control device interface 106, an output device interface 107, an input device interface 108, a communication device interface 109, a decoder 111 and a bus line 120. The system LSI 110 connects with the hard disk device 130, the external recording medium reading/writing device 140, the USB control device 150, the output device 160, the input device 170 and the communication device 180.

The CPU 101 connects with the bus line 120, and executes programs stored in the ROM 102 or the RAM 103 to control the ROM 102, the RAM 103, the hard disk device 130, the external recording medium reading/writing device 140, the USB control device 150, the output device 160, the input device 170, the communication device 180 and the decoder 111, thereby achieving a variety of functions. For example, the CPU 101 achieves a function to read image data stored in the hard disk device 130 to a memory area of the RAM 103.

The ROM 102 connects with the bus line 120, and stores therein a program that defines the operations of the CPU 101 and data for use by the CPU 101.

The RAM 103 connects with the bus line 120 and temporarily stores therein data resulting from execution of a program by the CPU 101. The RAM 103 also temporarily stores therein data such as data read from or data to be written to the hard disk device 130 and the external recording medium reading/writing device 140, as well as data received by or data to be transmitted by the communication device 180.

The decoder 111 is a DSP (Digital Signal Processor) having a function to decode encoded image data. The decoder 111 connects with the bus line 120, is controlled by the CPU 101 and has a JPEG decoding function.

The hard disk device interface 104, the external recording medium reading/writing device interface 105, the USB control device interface 106, the output device interface 107, the input device interface 108 and the communication device interface 109 respectively connect with the hard disk device 130, the external recording medium reading/writing device 140, the USB control device 150, the output device 160, the input device 170 and the communication device 180, and intermediate in the exchange of signals between these devices and the bus line 120.

The hard disk device 130 connects with the hard disk device interface 104 and is controlled by the CPU 101. The hard disk device 130 has a function to read and write data to and from a built-in hard disk. Image data is stored in the hard disk built in the hard disk device 130.

The external recording medium reading/writing device 140 connects with the external recording medium reading/writing device interface 105 and is controlled by the CPU 101. The external recording medium reading/writing device 140 has a function to read and write data to and from an external recording medium.

In this embodiment, the external recording medium is a DVD (Digital Versatile Disc), a DVD-R, a DVD-RAM, a BD (Blu-ray Disc), a BD-R, a BD-RE, the SD memory card 191, or the like. The external recording medium reading/writing device 140 has a function to read data from the DVD, the BD, or the like and a function to read and write data to and from the DVD-R, the BD-R, the BD-RE, the SD memory card 191, or the like.

The USB control device 150 connects with the USB control device interface 106 and is controlled by the CPU 101. The USB control device 150 has a function to read and write data to and from an external device via the removable USB cable 195.

In this embodiment, the external device is a device for storing images, such as the digital still camera 192, a personal computer, or a mobile phone having a camera function. The USB control device 150 reads and writes data to and from the external device via the USB cable 195.

The output device 160 connects with the output device interface 107 and the monitor cable 196 and is controlled by the CPU 101. The output device 160 outputs, via the monitor cable 196, data to be displayed on the display 193.

The input device 170 connects with the input device interface 108 and is controlled by the CPU 101. The input device 170 has a function to receive an operation command transmitted wirelessly from the user via the remote control 197 and to transmit the received operation command to the CPU 101.

The communication device 180 connects with the communication device interface 109 and the network 194 and is controlled by the CPU 101. The communication device 180 has a function to transmit and receive data to and from an external communication device via the network 194.

In this embodiment, the network 194 is achieved by optical communication lines, telephone lines, wireless lines, or the like, and connects with an external communication device, the Internet, etc.

The external communication device is a device for storing therein images and the program that defines the operations of the CPU 101, such as an external hard disk device. The communication device 180 reads data from the external communication device via the network 194.

The image data processing device 100, which is implemented by the hardware described above, achieves various functions by the CPU 101 executing the programs stored in the ROM 102 or the RAM 103 to control the ROM 102, the RAM 103, the hard disk device 130, the external recording medium reading/writing device 140, the USB control device 150, the output device 160, the input device 170, the communication device 180 and the decoder 111.

The following describes a functional configuration of the image data processing device 100, which is implemented by the CPU 101 executing the programs, with reference to the drawings.

<Functional Configuration of Image Data Processing Device 100>

Figure 2:
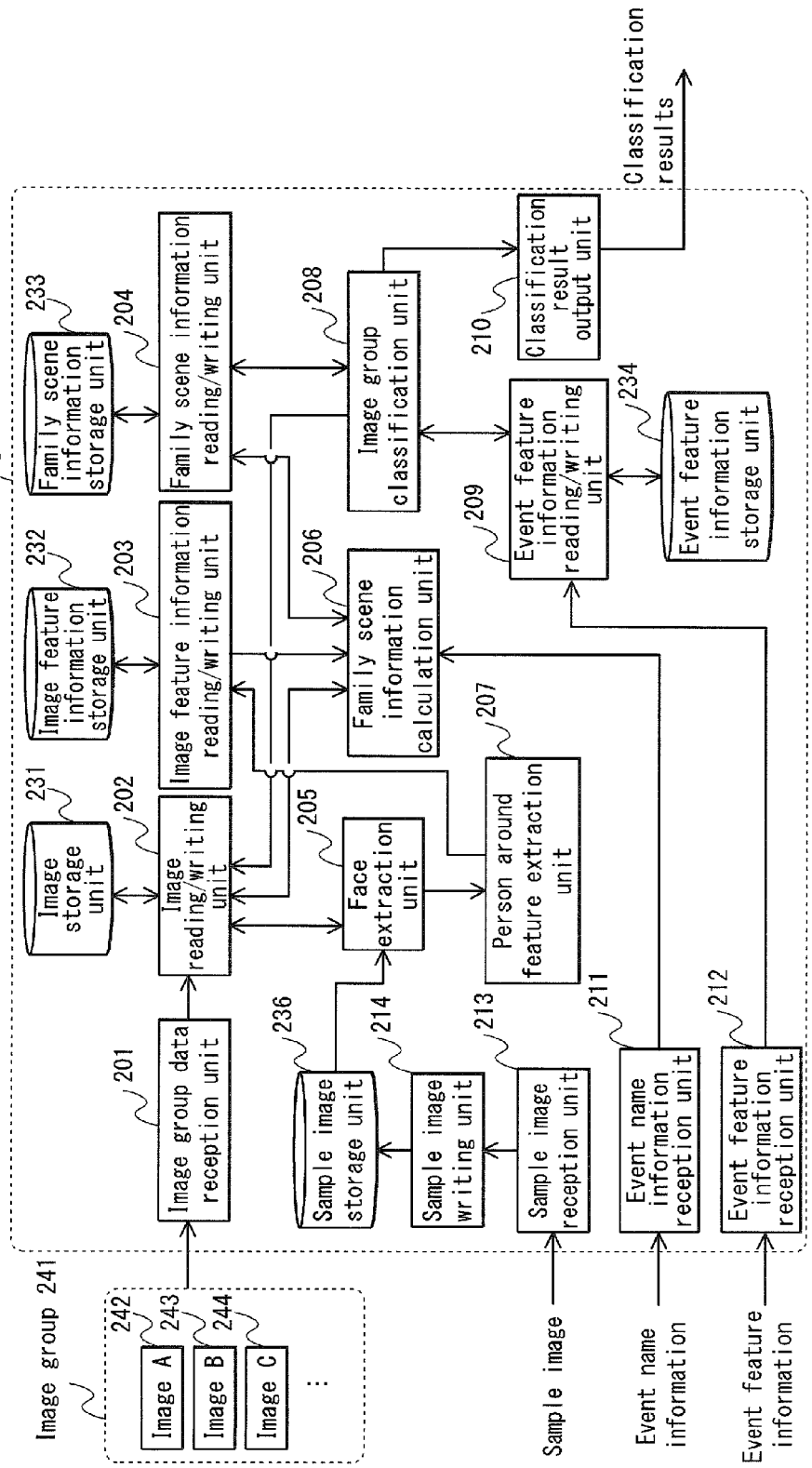
FIG. 2 is a functional block diagram illustrating a functional configuration of the image data processing device 100.

FIG. 2 is a functional block diagram illustrating main functional blocks of the image data processing device 100.

The image data processing device 100 includes an image group data reception unit 201, an image reading/writing unit 202, an image feature information reading/writing unit 203, a family scene information reading/writing unit 204, a face extraction unit 205, a family scene information calculation unit 206, a person around feature extraction unit 207, an image group classification unit 208, an event feature information reading/writing unit 209, a classification result output unit 210, an event name information reception unit 211, an event feature information reception unit 212, a sample image reception unit 213, a sample image writing unit 214, an event feature information storage unit 234 and a sample image storage unit 236.

The image group data reception unit 201 is a block implemented by the CPU 101 executing a program and connects with the image reading/writing unit 202. The image group data reception unit 201 has a function to receive, from a user, a designation of images included in an image group 241 composed of two or more images and read the designated images in a memory area of the RAM 103 as images included in the same image group, and a function to assign an image ID to each of the designated images in order to identify each of the designated images when reading the designated images.

The image group data reception unit 201 reads images from an external recording medium via the external recording medium reading/writing device 140, from an external device via the USB control device 150, or from an external communication device via the communication device 180.

The image storage unit 231 is a storage area for storing digital photographs, which are each an image, as image data encoded in the JPEG format. The image storage unit 231 connects with the image reading/writing unit 202 and is implemented as a portion of the hard disk built in the hard disk device 130.

Pieces of image data stored in the image storage unit 231 are logically managed as image files by a directory structure within a file system.

Figure 3:
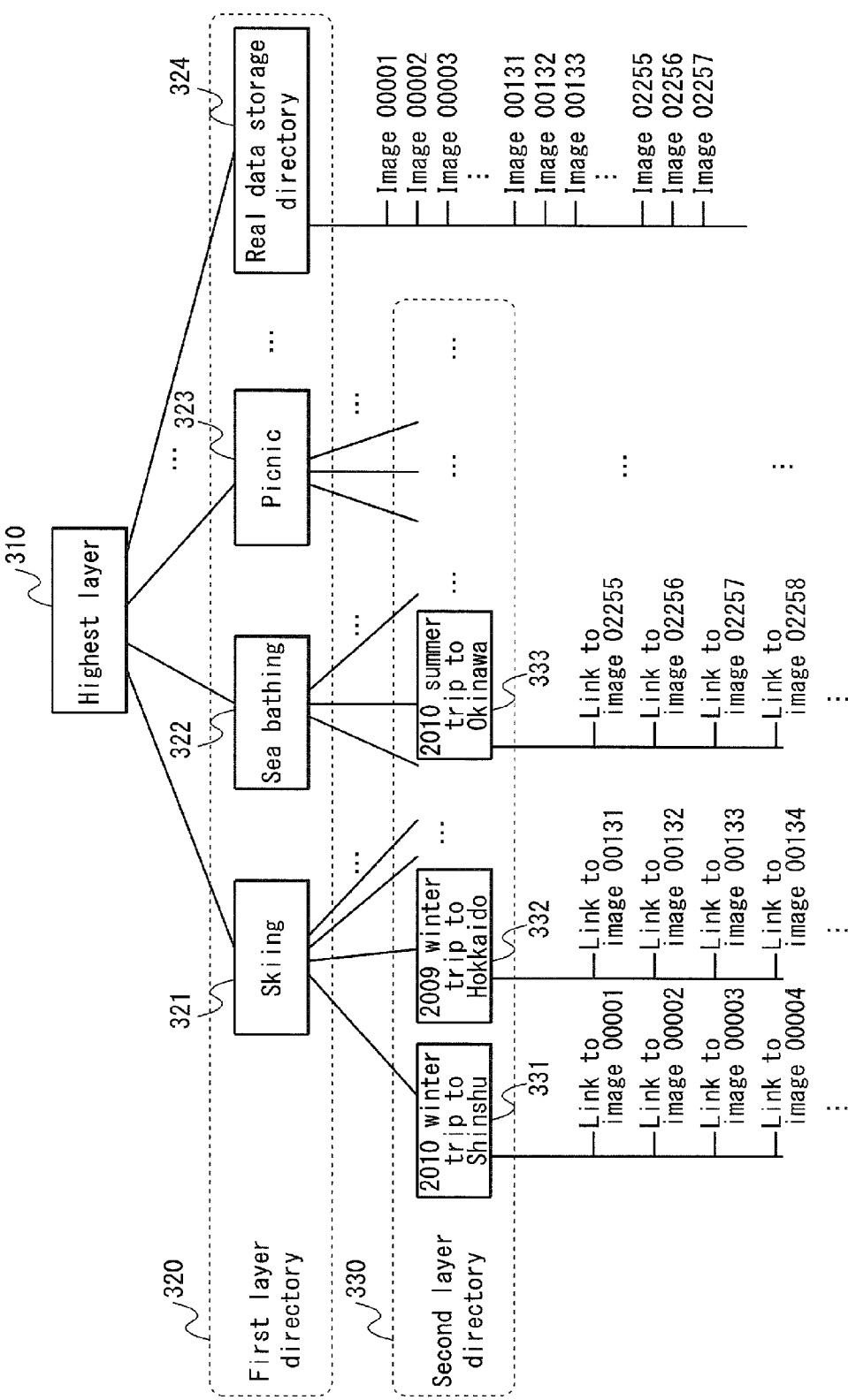
FIG. 3 shows a directory structure of an image storage unit 231.

FIG. 3 shows a directory structure of the image storage unit 231.

As shown in FIG. 3, the image storage unit 231 has a directory structure composed of three layers: a highest layer 310, a first directory layer 320 and a second directory layer 330.

The first directory layer 320 includes a plurality of classification event directories, such as a skiing directory 321, a sea bathing directory 322 and a picnic directory 323, as well as a real data storage directory 324.

The classification event directories here are directories having the same name as the classification events into which image groups are classified. No two directories have the same name.

The real data storage directory 324 is a directory for storing image data. Image data is stored only in the real data storage directory 324.

The second directory layer 330 includes a plurality of event directories, such as a 2010 winter trip to Shinshu directory 331, a 2009 winter trip to Hokkaido directory 332 and a 2010 summer trip to Okinawa directory.

The event directories each correspond to an image group composed of images received by the image group data reception unit 201. Each event directory stores information indicating, for all of the images belonging to the corresponding image group, the addresses of data among the data stored in the real data storage directory 324. The event directory thus links to the image data.

The event directories are each located under the classification event directory corresponding to the classification event into which the corresponding image group is classified.

If an image group is classified into a plurality of classification events, a directory with the same name and linking to the same images exists for each of the classification events.

A name of each event directory is an event name designated, by a user using the image data processing device 100, with respect to an image group corresponding to the event directory. A generation method of each event directory is detailed later in the section <Image Group Classification Processing>.

Returning to FIG. 2 again, the functional structure of the image data processing device 100 is now further described.

The image reading/writing unit 202 is a block implemented by the CPU 101 executing a program and connects with the image storage unit 231, the image group data reception unit 201, the face extraction unit 205, the family scene information calculation unit 206 and the image group classification unit 208. The image reading/writing unit 202 has a function to read images stored in the image storage unit 231, a function to write images to the image storage unit 231, a function to change the directory structure of the image storage unit 231, and a function to change links to image data stored in the image storage unit 231.

The sample image storage unit 236 is a storage area for storing a sample image, which is a digital photograph in which a face of a specific person (e.g. a family member) appears, as image data encoded in the JPEG format. The sample image storage unit 236 connects with the sample image writing unit 214 and the face extraction unit 205 and is implemented as a portion of the hard disk built in the hard disk device 130.

The sample image writing unit 214 is a block implemented by the CPU 101 executing a program and connects with the sample image reception unit 213. The sample image writing unit 214 has a function to write, to the sample image storage unit 236, a sample image and a corresponding face ID specifying a person appearing in the sample image received by the sample image reception unit 213.

The sample image reception unit 213 is a block implemented by the CPU 101 executing a program and connects with the sample image writing unit 214. The sample image reception unit 213 has a function to receive, from a user, a sample image in which a face of a specific person appears and a corresponding face ID specifying the person and read the received sample image and corresponding face ID in a memory area of the RAM 103 in association with each other, and a function to store the read sample image in the sample image storage unit 236 using the sample image writing unit 214.

The sample image reception unit 213 reads images from an external recording medium via the external recording medium reading/writing device 140, from an external device via the USB control device 150, or from an external communication device via the communication device 180.

The face extraction unit 205 is a block implemented by the CPU 101 executing a program and connects with the image reading/writing unit 202, the person around feature extraction unit 207 and the sample image storage unit 236. The face extraction unit 205 has the following three functions.

Function 1: to store predetermined face models indicating features of people's faces, to attempt to recognize any faces included in an image with reference to the stored face models, to, when any faces are recognized, calculate an area of a region of each recognized face and a position of each recognized face, and to sequentially assign face IDs each identifying a recognized face to respective recognized faces.

In this embodiment, the face models are, for example, information on the brightness of a part of a human face such as eyes, nose, or mouth, and relative positional relations between these parts. The region of each recognized face is a rectangular region having the smallest area of all rectangular regions that include the recognized face and are defined by horizontal and vertical lines in an image.

As the predetermined face models, for example, the face extraction unit 205 uses models held in the hard disk device 130 or refers to models stored outside.

Function 2: to, when any faces are recognized in an image, extract features of each recognized face and features of faces included in sample images stored in the sample image storage unit 236, and to, when the sample images stored in the sample image storage unit 236 include a sample image in which a face having the same features as the recognized face appears, judge that a person having the recognized face is the same as a person appearing in the sample image.

In this embodiment, the features of a face are, for example, a relative positional relation between parts of a face such as eyes, nose, or mouth, and an area ratio of each of these parts.

Function 3: to, when any faces are recognized in an image, calculate a body region positioned below a region of each recognized face as a rectangular region determined relative to the region of each recognized face according to a predetermine algorithm, to calculate an area and a position of the calculated body region, and to sequentially assign body IDs each identifying a calculated body region to respective calculated body regions.

In this embodiment, for example, the predetermined algorithm is an algorithm according to which the body region is calculated as a rectangular region positioned below a region of each recognized face and defined by a line 1.5 times longer than the horizontal width of the region of each recognized face and a line 2 times longer than the vertical width of the region of each recognized face so that a coordinate of a center of the body region coincides with a coordinate of a center of the face region in a horizontal direction.

The person around feature extraction unit 207 is a block implemented by the CPU 101 executing a program and connects with the face extraction unit 205 and the image feature information reading/writing unit 203. The person around feature extraction unit 207 has the following five functions.

Function 1: to calculate a face around region as a rectangular region determined, according to a predetermine algorithm, relative to the face region calculated by the face extraction unit 205, and to calculate a position of the calculated face around region.

In this embodiment, for example, the predetermined algorithm is an algorithm according to which the face around region is calculated as a rectangular region defined by a line obtained by adding a horizontal width of the face region to each of left and right sides of the face region and a line obtained by adding a vertical width of the face region to an upper side of the face region.

Function 2: to calculate a body around region as a rectangular region determined, according to a predetermine algorithm, relative to the face region calculated by the face extraction unit 205, and to calculate a position of the calculated body around region.

In this embodiment, for example, the predetermined algorithm is an algorithm according to which the body around region is calculated as a rectangular region defined by a line obtained by adding a horizontal width of the face region to each of left and right sides of the body region and a line obtained by adding a half vertical width of the face region to each of upper and lower sides of the body region.

Function 3: to calculate a person around region as a region determined, according to a predetermine algorithm, relative to the calculated face around region and body around region.

In this embodiment, for example, the predetermined algorithm is an algorithm according to which the person around region is calculated as a region obtained by removing the face region and the body region from a region included in at least one of the face around region and the body around region.

Function 4: to determine, for each pixel in the person around region, which of a predetermined number N of primary colors (e.g. black, blue, green and white) is similar to the color of the pixel based on the color component of the pixel, such as the brightness of each of the colors R (Red), G (Green), and B (Blue), and to calculate, for each of the determined colors, the ratio of the number of pixels of the determined color to the total number of pixels in the person around region as a person around feature.

Which of the primary colors is similar to the color of a certain pixel is determined, for example, by determining, for each primary color, in advance a corresponding range of the brightness of each of the colors R, G and B, and by comparing the brightness of each of the colors R, G and B of the certain pixel with the determined range of the brightness of each of the colors R, G and B to determine which of the primary colors is similar to the color of the certain pixel.

Function 5: to generate image feature information (described later.)

Figure 4:
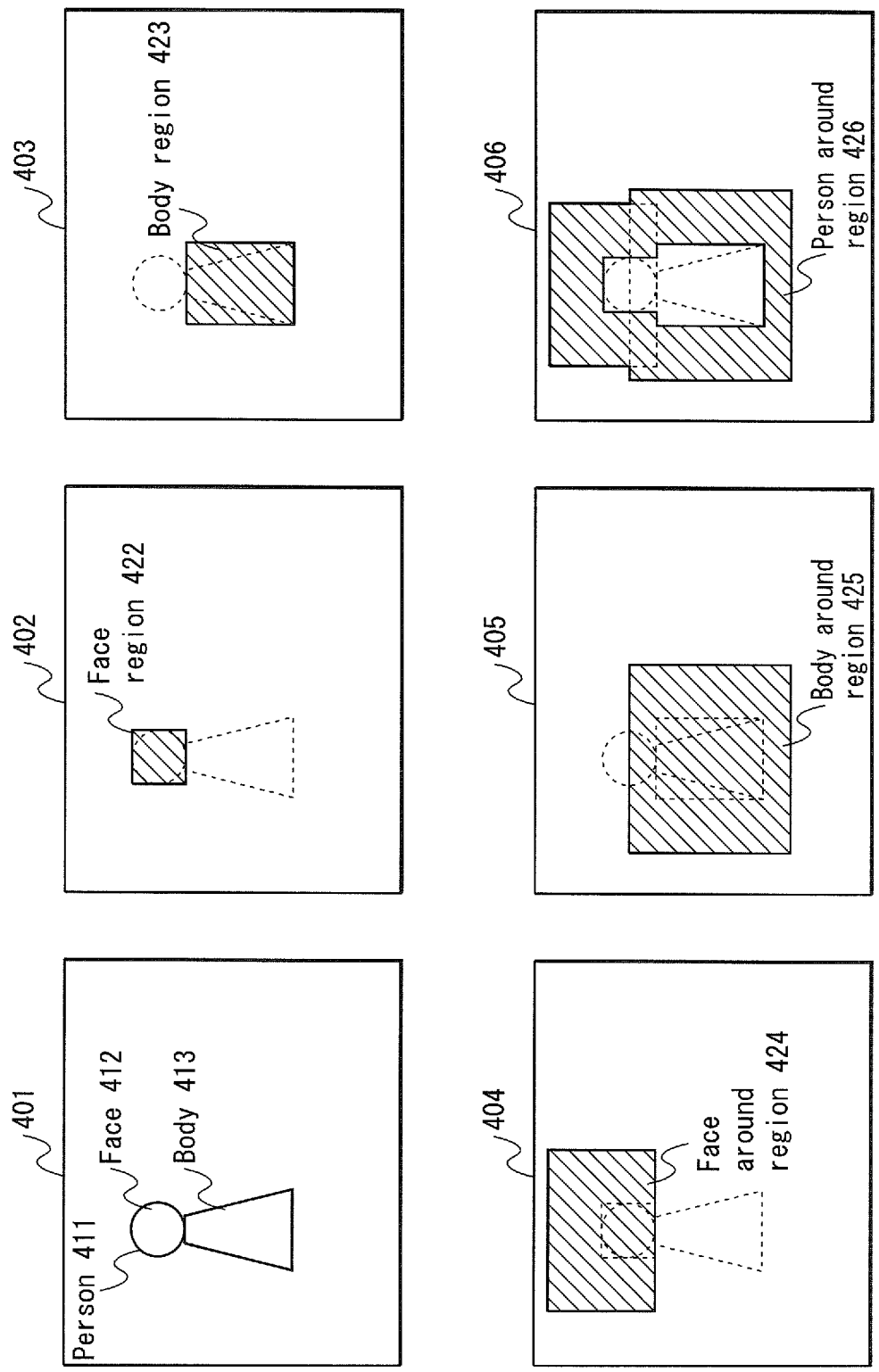
FIG. 4 is a schematic diagram visually illustrating various regions.

FIG. 4 is a schematic diagram visually illustrating various regions described above.

In FIG. 4, an image 401 is an image in which a person 411 composed of a face 412 and a body 413 appears.

A face region 422 of the image 401 extracted by the face extraction unit 205 is shown in a first modified image 402. A body region 423 of the image 401 extracted by the face extraction unit 205 is shown in a second modified image 403. A face around region 424 of the image 401 extracted by the person around feature extraction unit 207 is shown in a third modified image 404. A body around region 425 of the image 401 extracted by the person around feature extraction unit 207 is shown in a fourth modified image 405. A person around region 426 of the image 401 extracted by the person around feature extraction unit 207 is shown in a fifth modified image 406.

The face region 422, the body region 423, the face around region 424, the body around region 425 and the person around region 426 are thus calculated from the image 401.

Figure 5:
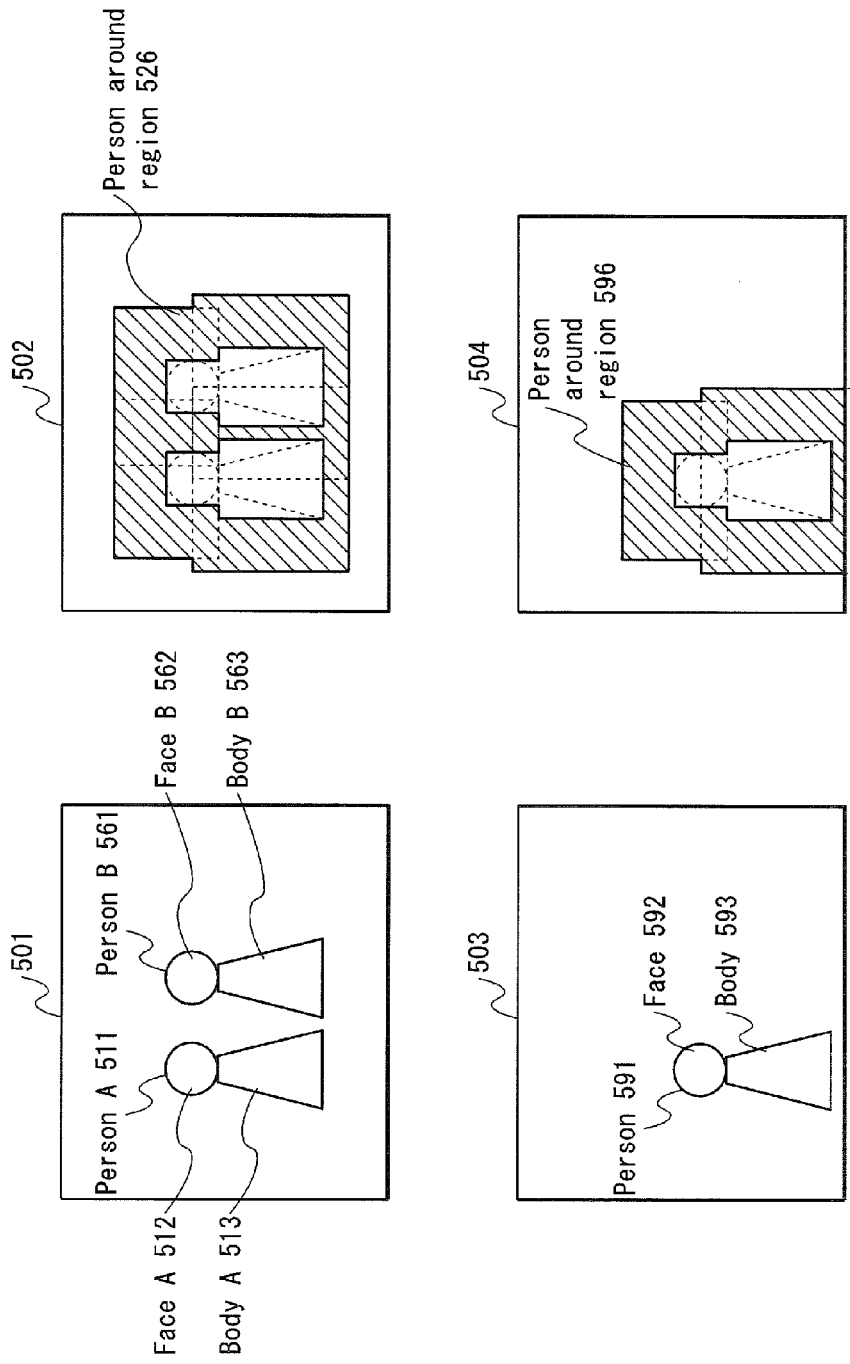
FIG. 5 is a schematic diagram visually illustrating person around regions in special circumstances.

FIG. 5 is a schematic diagram visually illustrating the person around regions in special circumstances.

In FIG. 5, an image 501 is an example of an image including a plurality of recognized faces. The image 501 includes two recognized faces, i.e. a face of a person 511 composed of a face A512 and a body A513 and a face of a person 561 composed of a face B562 and a body B563.

A person around region 526 of the image 501 extracted by the person around feature extraction unit 207 is shown in a modified image 502.

As illustrated in the modified image 502, the person around feature extraction unit 207 calculates, as the person around region, a region obtained by removing the face region corresponding to the face A512, the face region corresponding to the B562, the body region corresponding to the A513 and the body region corresponding to the B563 from a region included in at least one of the face around region corresponding to the face A512, the face around region corresponding to the face B562, the body around region corresponding to the body A513 and the body around region corresponding to the body B563.

As described above, when one image includes a plurality of recognized faces, the person around feature extraction unit 207 calculates, as the person around region, a region obtained by removing all the face regions and the body regions from a region included in at least one of the face around regions and the body around regions.

An image 503 is an example of an image which includes a recognized face and from which a part of the face around region or the body around region extends. The image 503 includes a person 591 composed of a face 592 and a body 593.

A person around region 596 of the image 503 extracted by the person around feature extraction unit 207 is shown in a modified image 504.

As illustrated in the modified image 504, the person around feature extraction unit 207 calculates, as the person around region, a region obtained by removing the face region, the body region and a region not included in the image 503 from a region included in at least one of the face around region and the body around region.

Returning to FIG. 2 again, the functional structure of the image data processing device 100 is now further described.

The image feature information storage unit 232 is a storage area for storing the image feature information. The image feature information storage unit 232 connects with the image feature information reading/writing unit 203 and is implemented as a portion of the hard disk built in the hard disk device 130.

FIG. 6 shows an example of a data structure of the image feature information stored in the image feature information storage unit 232.

As shown in FIG. 6, the image feature information is composed of an image ID 600, a face feature 610, a body feature 620, a face around region 630, a body around region 640 and a person around feature 650, all of which are associated with one another.

Furthermore, the face feature 610 is composed of a face ID 611, a face area 612, a face position 613 and a corresponding face ID 614, all of which are associated with one another. The body feature 620 is composed of a body ID 621, a body area 622 and a body position 623, all of which are associated with one another. The person around feature 650 is composed of a black ratio 651, a blue ratio 652, a green ratio 653 and a white ratio 654, all of which are associated with one another.

The image ID 600 is provided by the image group data reception unit 201 for each image in order to identify the image.

The face ID 611 is provided by the face extraction unit 205 for each recognized face in order to identify the face.

The face area 612 is an area ratio of the face region calculated by the face extraction unit 205 to the entire image. The face area 612 is normalized so as to be one when the area of the face region is equal to the area of the entire image.

The face position 613 is coordinates showing a position of the face region calculated by the face extraction unit 205. The face position 613 is composed of coordinates of an upper left corner of the face region, which is rectangular, and coordinates of a lower right corner of the face region in an image.

The corresponding face ID 614 identifies a person included in an image stored in the sample image storage unit 236. For example, in this embodiment, a corresponding face ID 614 "01" indicates that the person is a son, a corresponding face ID 614 "02" indicates that the person is a father and a corresponding face ID 614 "03" indicates that the person is a mother. For example, when the sample image storage unit 236 does not store an image including a person whose face has the same feature as a face identified by the face ID 611, the corresponding face ID 614 is "99." Also, for example, when the corresponding face ID 614 is "01", "02" or "03", the person is a family member.

The body ID 621 is provided by the face extraction unit 205 for each body region in order to identify the body region.

The body area 622 is an area ratio of the body region calculated by the face extraction unit 205 to the entire image. The body area 622 is normalized so as to be one when the area of the body region is equal to the area of the entire image.

The body position 623 is coordinates showing a position of the body region calculated by the face extraction unit 205. The body position 623 is composed of coordinates of an upper left corner of the body region, which is rectangular, and coordinates of a lower right corner of the body region in an image.

The face around region 630 is coordinates showing a position of the face around region calculated by the person around feature extraction unit 207. The face around region 630 is composed of coordinates of an upper left corner of the face around region and coordinates of a lower right corner of the face around region in an image. In this embodiment, the coordinates indicate X and Y coordinates in a coordinate system having an origin (0, 0) at an upper left corner of the image.

The body around region 640 is coordinates showing a position of the body around region calculated by the person around feature extraction unit 207. The body around region 640 is composed of coordinates of an upper left corner of the body around region, which is rectangular, and coordinates of a lower right corner of the body around region in an image.

The black ratio 651 is a ratio of the number of pixels determined to be black to the total number of pixels in the person around region calculated by the person around feature extraction unit 207.

The blue ratio 652 is a ratio of the number of pixels determined to be blue to the total number of pixels in the person around region calculated by the person around feature extraction unit 207.

The green ratio 653 is a ratio of the number of pixels determined to be green to the total number of pixels in the person around region calculated by the person around feature extraction unit 207.

The white ratio 654 is a ratio of the number of pixels determined to be white to the total number of pixels in the person around region calculated by the person around feature extraction unit 207.

Returning to FIG. 2 again, the functional structure of the image data processing device 100 is now further described.

The image feature information reading/writing unit 203 is a block implemented by the CPU 101 executing a program and connects with the person around feature extraction unit 207, the family scene information calculation unit 206 and the image feature information storage unit 232. The image feature information reading/writing unit 203 has a function to read and write the image feature information to and from the image feature information storage unit 232.

The event name information reception unit 211 is a block implemented by the CPU 101 executing a program and connects with the family scene information calculation unit 206. The event name information reception unit 211 has a function to receive an event name, which is a name of an image group, input by a user using the image data processing device 100.

The family scene information calculation unit 206 is a block implemented by the CPU 101 executing a program and connects with the image reading/writing unit 202, the image feature information reading/writing unit 203, the family scene information reading/writing unit 204 and the event name information reception unit 211. The family scene information calculation unit 206 has the following two functions.

Function 1: to calculate, for each image including a recognized face, an image family scene feature (described later) as a value determined relative to the person around feature according to a predetermined algorithm.

In this embodiment, for example, the predetermined algorithm is an algorithm according to which each image family scene color ratio constituting the image family scene feature is calculated by dividing a value of each color ratio constituting the person around feature by a value of the face area. According to the algorithm, the calculated image family scene feature has been weighted such that a value of an image family scene feature of an image including a face region that is smaller in area is higher than that of an image including a face region that is larger in area.

Function 2: to calculate, for each image group, an image group family scene feature (described later) as a value determined relative to the image family scene features of images included in the image group according to a predetermined algorithm.

In this embodiment, for example, the predetermined algorithm is an algorithm according to which images each including a face recognized as a family member's face are extracted from images included in the image group, and, with respect to the extracted images, an average value of each image family scene color ratio constituting the image family scene feature is calculated as a value of each image group family scene color ratio constituting the image group family scene feature.

In this embodiment, the family member's face is a face identified by a corresponding face ID indicating a family member.

Function 3: to generate image family scene information (described later) and image group family scene information (described later.)

A family scene information storage unit 233 is a storage area for storing the image family scene information and the image group family scene information. The family scene information storage unit 233 connects with the family scene information reading/writing unit 204 and is implemented as a portion of the hard disk built in the hard disk device 130.

FIG. 7 shows an example of a data structure of the image family scene information stored in the family scene information storage unit 233.

As shown in FIG. 7, the image family scene information is composed of an image ID 700, a face ID 710, a corresponding face ID 720 and an image family scene feature 730, all of which are associated with one another.

The image family scene feature 730 is further composed of an image family scene black ratio 731, an image family scene blue ratio 732, an image family scene green ratio 733 and an image family scene white ratio 734, all of which are associated with one another.

The image ID 700, the face ID 710 and the corresponding face ID 720 are respectively equivalent to the image ID 600, the face ID 611 and the corresponding face ID 614 shown in FIG. 6. Therefore, description thereof is omitted.

The image family scene black ratio 731 is a value calculated by weighting a value of the black ratio 651 (see FIG. 6) of a corresponding image. The family scene information calculation unit 206 calculates the image family scene black ratio 731 by dividing the value of the black ratio 651 by a value of the face area 612 of the corresponding image.

The image family scene blue ratio 732 is a value calculated by weighting a value of the blue ratio 652 of a corresponding image. The family scene information calculation unit 206 calculates the image family scene blue ratio 732 by dividing the value of the blue ratio 652 by a value of the face area 612 of the corresponding image.

The image family scene green ratio 733 is a value calculated by weighting a value of the green ratio 653 of a corresponding image. The family scene information calculation unit 206 calculates the image family scene green ratio 733 by dividing the value of the green ratio 653 by a value of the face area 612 of the corresponding image.

The image family scene white ratio 734 is a value calculated by weighting a value of the white ratio 654 of a corresponding image. The family scene information calculation unit 206 calculates the image family scene white ratio 734 by dividing the value of the white ratio 654 by a value of the face area 612 of the corresponding image.

FIG. 8 shows an example of a data structure of the image group family scene information stored in the family scene information storage unit 233.

As shown in FIG. 8, the image group family scene information is composed of an image group ID 800, an event name 810 and an image group family scene feature 820, all of which are associated with one another.

The image group family scene feature 820 is further composed of an image group family scene black ratio 821, an image group family scene blue ratio 822, an image group family scene green ratio 823 and an image group family scene white ratio 824, all of which are associated with one another.

The image group ID 800 is an ID identifying an image group.

The event name 810 is an event name, which is a name of an image group, input by a user using the image data processing device 100 via the event name information reception unit 211.

The image group family scene black ratio 821 is an average value of the image family scene black ratios 731 (see FIG. 7) of images each including a face recognized as a family member's face extracted from images included in a corresponding image group. The image group family scene black ratio 821 is calculated by the family scene information calculation unit 206.

The image group family scene blue ratio 822 is an average value of the image family scene blue ratios 732 of images each including a face recognized as a family member's face extracted from images included in a corresponding image group. The image group family scene blue ratio 822 is calculated by the family scene information calculation unit 206.

The image group family scene green ratio 823 is an average value of the image family scene green ratios 733 of images each including a face recognized as a family member's face extracted from images included in a corresponding image group. The image group family scene green ratio 823 is calculated by the family scene information calculation unit 206.

The image group family scene white ratio 824 is an average value of the image family scene white ratios 734 of images each including a face recognized as a family member's face extracted from images included in a corresponding image group. The image group family scene white ratio 824 is calculated by the family scene information calculation unit 206.

Returning to FIG. 2 again, the functional structure of the image data processing device 100 is now further described.

The family scene information reading/writing unit 204 is a block implemented by the CPU 101 executing a program and connects with the family scene information calculation unit 206, the image group classification unit 208 and the family scene information storage unit 233. The family scene information reading/writing unit 204 has a function to read and write the image family scene information and the image group family scene information to and from the family scene information storage unit 233.

The event feature information storage unit 234 is a storage area for storing the event feature information. The event feature information storage unit 234 connects with the event feature information reading/writing unit 209 and is implemented as a portion of the hard disk built in the hard disk device 130.

FIG. 9 shows an example of a data structure of the event feature information stored in the event feature information storage unit 234.

As shown in FIG. 9, in the event feature information, image group family scene black ratio 1.5 or more 901, image group family scene blue ratio 1.5 or more 902, image group family scene green ratio 1.5 or more 903 and image group family scene white ratio 1.5 or more 904, which are examples of a classification condition 900, are respectively associated with fireworks 911, sea bathing 912, picnic 913 and skiing 914, which are examples of a classification event 910.

Returning to FIG. 2 again, the functional structure of the image data processing device 100 is now further described.

The event feature information reading/writing unit 209 is a block implemented by the CPU 101 executing a program and connects with the image group classification unit 208, the event feature information reception unit 212 and the event feature information storage unit 234. The event feature information reading/writing unit 209 has a function to read and write the event feature information to and from the event feature information storage unit 234.

The event feature information reception unit 212 is a block implemented by the CPU 101 executing a program and connects with the event feature information reading/writing unit 209. The event feature information reception unit 212 has a function to receive the event feature information input by a user using the image data processing device 100 and store the received event feature information in the event feature information storage unit 234 using the event feature information reading/writing unit 209.

The event feature information reception unit 212 receives the event feature information by user operation of the remote control 197, from an external recording medium via the external recording medium reading/writing device 140, from an external device via the USB control device 150 or from an external communication device via the communication device 180.

The image group classification unit 208 is a block implemented by the CPU 101 executing a program and connects with the image reading/writing unit 202, the family scene information reading/writing unit 204, the event feature information reading/writing unit 209 and the classification result output unit 210. The image group classification unit 208 has a function to classify image groups into the classification events based on the image group family scene information stored in the family scene information storage unit 233 and the event feature information stored in the event feature information storage unit 234.

A method for classifying image groups performed by the image group classification unit 208 is detailed later in the section <Image Group Classification Processing>.

The classification result output unit 210 is a block implemented by the CPU 101 executing a program and connects with the image group classification unit 208. The classification result output unit 210 has a function to display, on the display 193, results of classification of image groups performed by the image group classification unit 208.

With reference to the drawings, the following describes the operations of the image data processing device 100 having the above configuration.

<Operations>

The image data processing device 100 performs, as characteristic operations, image feature information generation processing, image family scene information generation processing, image group family scene information generation processing and image group classification processing.

The following describes each operation with reference to the drawings.

<Image Feature Information Generation Processing>

The image feature information generation processing, which is performed by the image data processing device 100, is processing to read images in units of image groups and to generate the image feature information for each of the read images.

Figure 10:
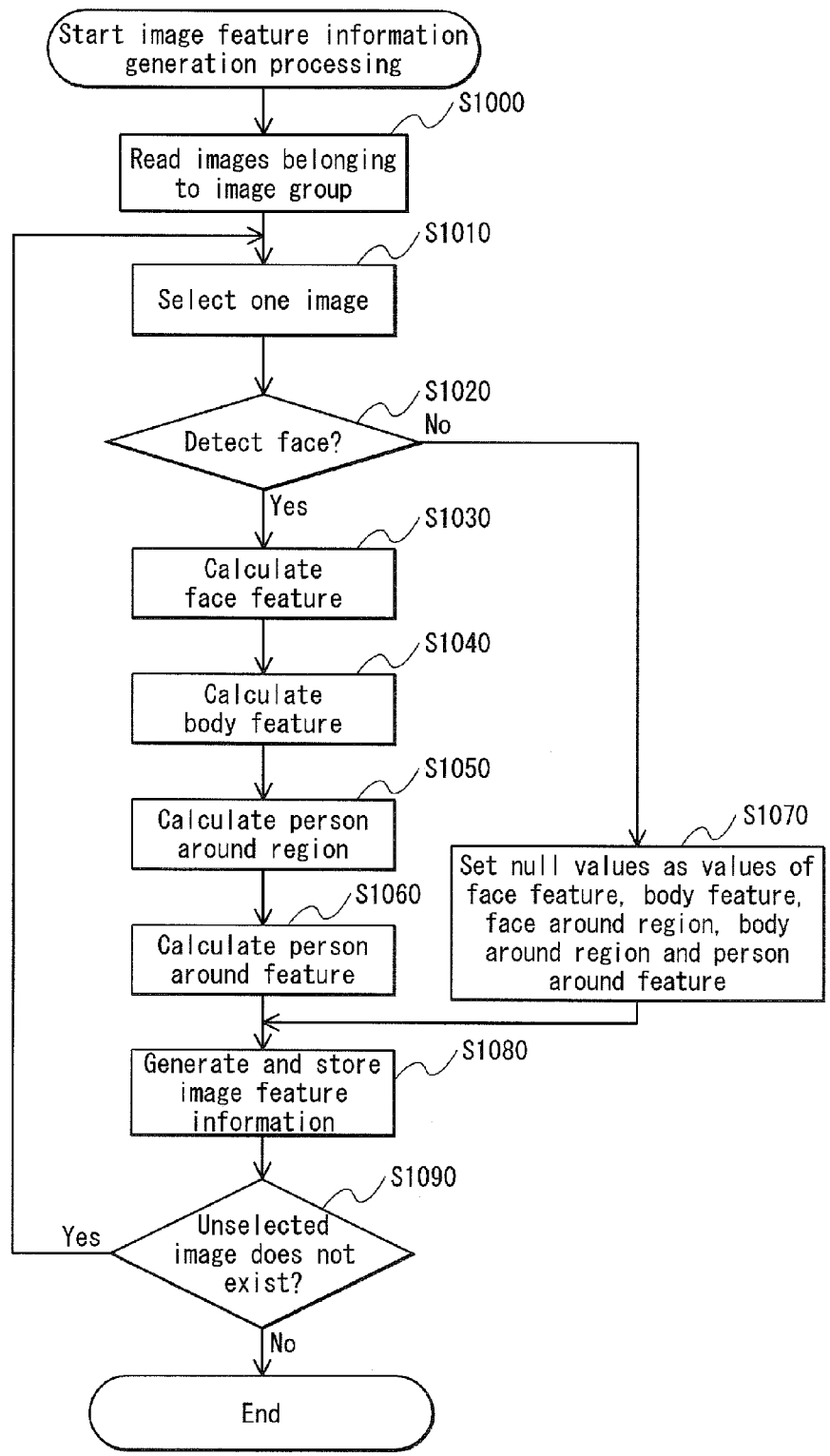
FIG. 10 is a flow chart of image feature information generation processing.

FIG. 10 is a flow chart of the image feature information generation processing performed by the image data processing device 100.

The image feature information generation processing starts when the remote control 197 receives a user operation indicating to start the image feature information generation processing.

When the image feature information generation processing starts, the image group data reception unit 201 starts reading images belonging to one image group, and the event name information reception unit 211 starts receiving a name of an event at which the images belonging to the image group were photographed (step S1000.)

The image group data reception unit 201 reads images from an external recording medium mounted in the external recording medium reading/writing device 140, from an external device via the USB cable 195 connected to the USB control device 150, or from the communication device 180 connected to the network 194.

In this embodiment, the image group data reception unit 201 reads, from the external recording medium reading/writing device 140, images belonging to an image group recorded on the SD memory card 191 that is an external recording medium.

The image group data reception unit 201 reads images recorded on the SD memory card 191 one by one, sequentially assigns image IDs to the read images to associate image data pieces with the image IDs and uses the image reading/writing unit 202 to write the images to the real data storage directory 324 of the image storage unit 231.

The event name information reception unit 211 receives, by user operation of the remote control 197, a name of an event at which the images belonging to the image group were photographed.

After all of the images belonging to the image group are written into the image storage unit 231, the face extraction unit 205 uses the image reading/writing unit 202 to select and read, one by one, the images belonging to the image group received by the image group data reception unit 201 from the image storage unit 231 (step S1010) and decodes the read images in the JPEG format.

By referring to the stored face models, the face extraction unit 205 attempts to recognize any faces included in each read image (step S1020.)

When recognizing any faces (step S1020: Yes), the face extraction unit 205 calculates a face feature for each recognized face (step S1030.) That is to say, the face extraction unit 205 calculates an area of a region of each recognized face and a position of the recognized face, sequentially assigns face IDs each identifying a recognized face to respective recognized faces, extracts features of each recognized face and features of faces appearing in sample images stored in the sample image storage unit 236, and, when the sample image storage unit 236 includes a sample image including a face having the same features as those of the recognized face, assigns a corresponding face ID of the sample image to a corresponding face ID of the recognized face. When the sample image storage unit 236 does not include a sample image including a face having the same features as those of the recognized face, the face extraction unit 205 assigns a value "99" meaning that the recognized face is a face of a non-family member to a corresponding face ID of the recognized face.

After completing the processing in the step S1030, the face extraction unit 205 calculates a body region positioned below the region of the recognized face, and calculates a body feature for each calculated body region (step S1040.) That is to say, the face extraction unit 205 calculates an area and a position of the calculated body region, and sequentially assigns body IDs each identifying a calculated body region to respective calculated body regions.

After completing the processing in the step S1040, the person around feature extraction unit 207 calculates the face around region based on the face region, the body around region based on the body region, and the person around region from the calculated face around region and body around region (step S1050.)

The person around feature extraction unit 207 further calculates the person around feature based on a value of each pixel included in the person around region (step S1060.) That is to say, the person around feature extraction unit 207 determines the color of each pixel in the person around region based on the brightness of each of color components R, G and B in the pixel. The person around feature extraction unit 207 calculates, for each of the determined colors, the ratio of the number of pixels of the determined color to the total number of pixels in the person around region as a color ratio of the determined color.

When the face extraction unit 205 does not recognize any faces in the processing in the step S1020 (step S1020: No), the face extraction unit 205 sets a null value as a value of each component of the face feature and as a value of each component of the body feature, and the person around feature extraction unit 207 sets a null value as a value of the face around region, a value of the body around region and a value of each component of the person around feature (step S1070.)

After completing the processing in the step S1060 or the step S1070, the person around feature extraction unit 207 generates the image feature information for a target image, and uses the image feature information reading/writing unit 203 to store the generated image feature information in the image feature information storage unit 232 (step S1080.)

After completing the processing in the step S1080, the face extraction unit 205 verifies whether or not any unselected image exists among the images belonging to the image group received by the image group data reception unit 201 (step S1090.)

If the face extraction unit 205 verifies in the processing in the step S1090 that any unselected image exists (step S1090: No), the image data processing device 100 returns to the processing in the step S1010 and performs the processing in and after the step S1010.

If the face extraction unit 205 verifies in the processing in the step S1090 that any unselected image does not exist (step S1090: Yes), the image data processing device 100 ends the image feature information generation processing.

<Image Family Scene Information Generation Processing>

The image family scene information generation processing, which is performed by the image data processing device 100, is processing to generate the image family scene information based on the image feature information.

Figure 11:
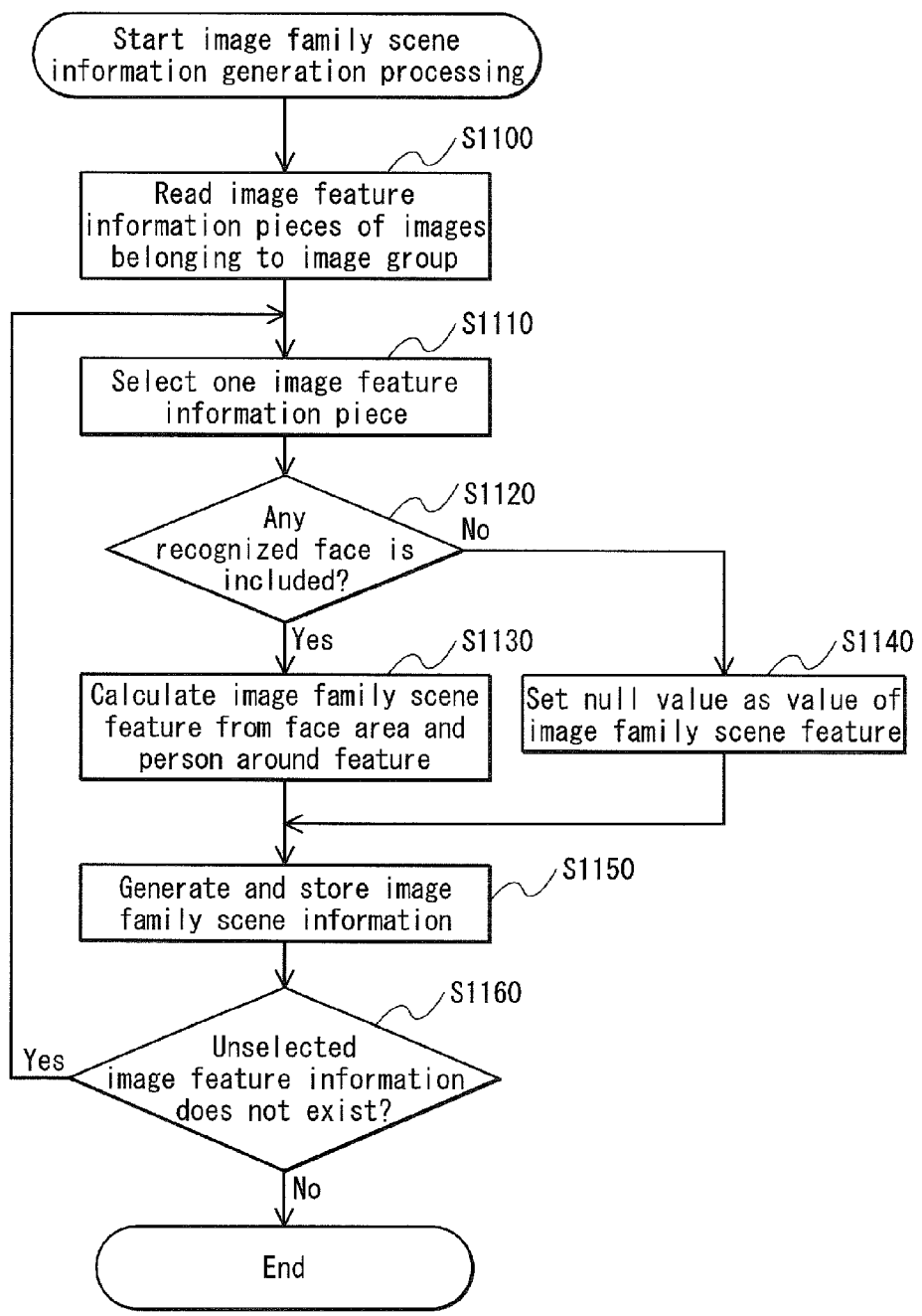
FIG. 11 is a flow chart of image family scene information generation processing.

FIG. 11 is a flow chart of the image family scene information generation processing performed by the image data processing device 100.

The image family scene information generation processing starts when the image data processing device 100 ends the image feature information generation processing.

When the image family scene information generation processing starts, the family scene information calculation unit 206 uses the image feature information reading/writing unit 203 to read, from the image feature information storage unit 232, the image feature information pieces of the images belonging to the image group processed in the image feature information generation processing (step S1100.)

The family scene information calculation unit 206 selects one of the read image feature information pieces (step S1110), and verifies whether or not any recognized face is included in an image corresponding to the selected image feature information (step S1120.) In this embodiment, whether or not any recognized face is included is verified by verifying whether or not a value of each component of the face feature is a null value.

If any recognized face is included (step S1120: Yes), the family scene information calculation unit 206 calculates the image family scene feature from the face area 612 (see FIG. 6) and the person around feature 650 (step S1130.) That is to say, the family scene information calculation unit 206 calculates a value of each image family scene color ratio by dividing a value of each color ratio constituting the person around feature 650 by a value of the face area 612.

If the family scene information calculation unit 206 verifies that any recognized face is not included in the processing in the step S1120 (step S1120: No), the family scene information calculation unit 206 sets a null value as a value of the image family scene feature (step S1140.) That is to say, the family scene information calculation unit 206 sets a null value as a value of each image family scene color ratio constituting the image family scene feature.

After completing the processing in the step S1130 or the step S1140, the family scene information calculation unit 206 generates the image family scene information with respect to target image feature information, and uses the family scene information reading/writing unit 204 to store the generated image family scene information in the family scene information storage unit 233 (step S1150.)

After completing the processing in the step S1150, the family scene information calculation unit 206 verifies whether or not any unselected image feature information exists among the image feature information pieces of the images belonging to the target image group (step S1160.)

If the family scene information calculation unit 206 verifies in the processing in the step S1160 that any unselected image feature information exists (step S1160: No), the image data processing device 100 returns to the processing in the step S1110 and performs the processing in and after the step S1110.

If the family scene information calculation unit 206 verifies in the processing in the step S1160 that any unselected image feature information does not exist (step S1160: Yes), the image data processing device 100 ends the image family scene information generation processing.

<Image Group Family Scene Information Generation Processing>

The image group family scene information generation processing, which is performed by the image data processing device 100, is processing to generate the image group family scene information for an image group based on the image family scene information for each image belonging to the image group.

Figure 12:
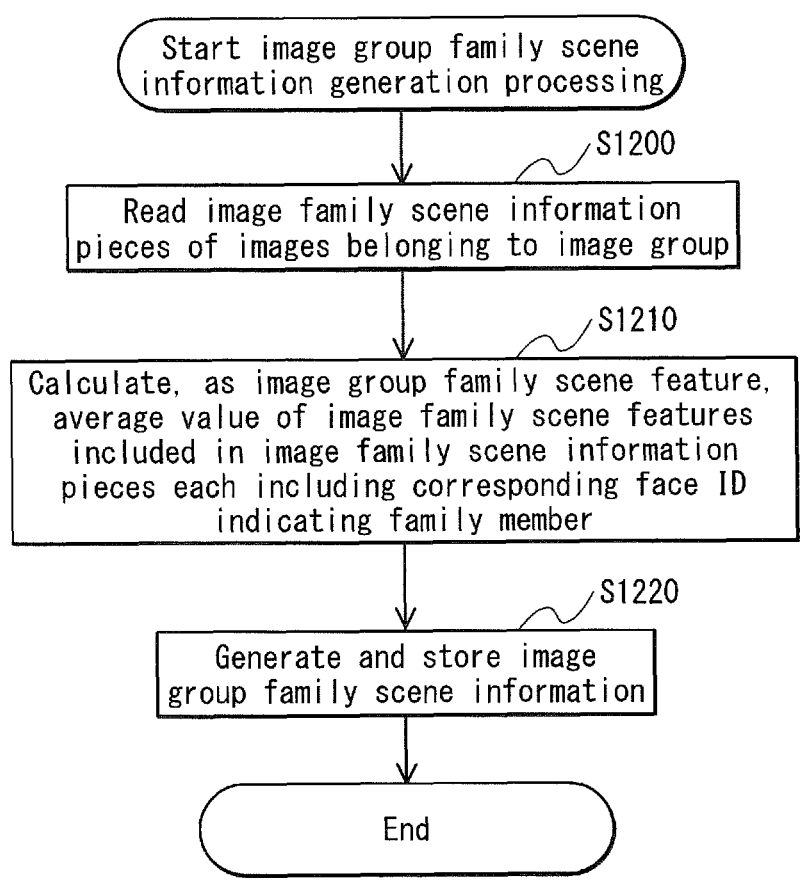
FIG. 12 is a flow chart of image group family scene information generation processing.

FIG. 12 is a flow chart of the image group family scene information generation processing performed by the image data processing device 100.

The image group family scene information generation processing starts when the image data processing device 100 ends the image family scene information generation processing.

When the image group family scene information generation processing starts, the family scene information calculation unit 206 uses the family scene information reading/writing unit 204 to read, from the family scene information storage unit 233, the image family scene information pieces of the images belonging to the image group processed in the image family scene information generation processing (step S1200.)

The family scene information calculation unit 206 calculates, as the image group family scene feature, an average value of image family scene features of images each corresponding to a corresponding face ID 720 (see FIG. 7) indicating a family member extracted from the read image family scene information pieces (step S1210.) That is to say, with respect to the image family scene information pieces each including a corresponding face ID 720 indicating a family member, an average value of each image family scene color ratio constituting the image family scene feature 730 is calculated as each image group family scene color ratio.

If there is no image family scene information including a corresponding face ID 720 indicating a family member, the family scene information calculation unit 206 sets a null value as a value of each image group family scene color ratio constituting the image group family scene feature.

After completing the processing in the step S1210, the family scene information calculation unit 206 generates the image group family scene information for a target image group, and uses the family scene information reading/writing unit 204 to store the generated image group family scene information in the family scene information storage unit 233 (step S1220.) The image data processing device 100 ends the image group family scene information generation processing. In the image group family scene information generation processing, an event name received, from a user, by the event name information reception unit 211 in the step S1000 of the image feature information generation processing is used as the event name 810 (see FIG. 8.)

<Image Group Classification Processing>

The image group classification processing, which is performed by the image data processing device 100, is processing to classify image groups into the classification events.

Figure 13:
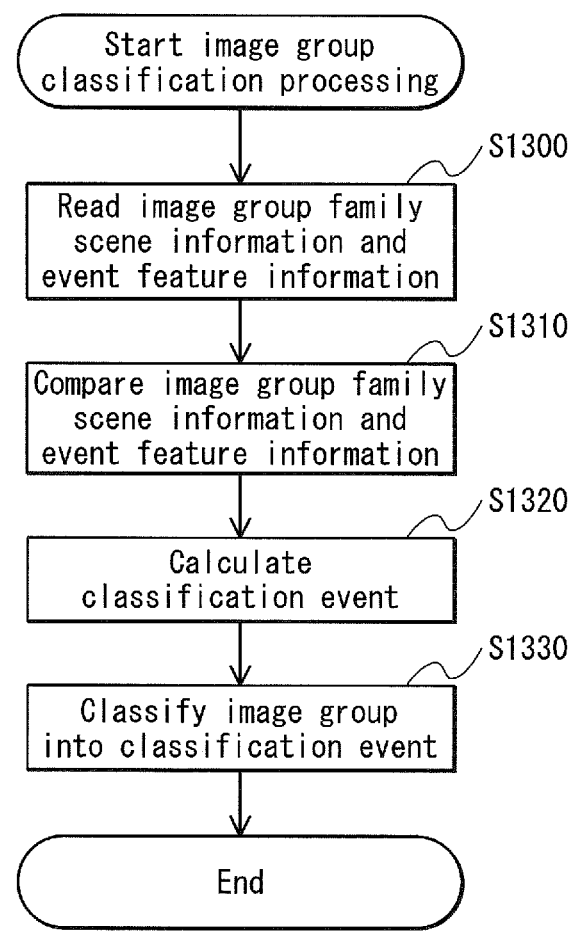
FIG. 13 is a flow chart of image group classification processing.

FIG. 13 is a flow chart of the image group classification processing performed by the image data processing device 100.

The image group classification processing starts when the image data processing device 100 ends the image group family scene information generation processing.

When the image group classification processing starts, the image group classification unit 208 uses the family scene information reading/writing unit 204 to read, from the family scene information storage unit 233, the image group family scene information for the image group processed in the image group family scene information generation processing, and uses the event feature information reading/writing unit 209 to read the event feature information from the event feature information storage unit 234 (step S1300.)

After completing the processing in the step S1300, the image group classification unit 208 compares the read image group family scene information and the read event feature information (step S1310), and calculates the classification event into which the image group is to be classified (step S1320.) That is to say, the image group classification unit 208 verifies whether or not any image group family scene color ratio (see FIG. 8) included in the image group family scene information meets the classification condition 900 (see FIG. 9) included in the event feature information. If any image group family scene color ratio meets the classification condition 900 included in the event feature information, the image group classification unit 208 calculates the classification event 910 corresponding to the classification condition 900 as a classification event into which the image group is to be classified. If no image group family scene color ratio meets the classification condition 900 included in the event feature information, the image group classification unit 208 calculates a classification event "other events" as a classification event into which the image group is to be classified.

If the image group family scene color ratio included in the image group family scene information is set as a null value, the image group classification unit 208 calculates the classification event "other events" as a classification event into which the image group is to be classified.

If a plurality of classification conditions 900 are met, all the classification events 910 corresponding to the met classification conditions 900 are calculated as the classification events into which the image group is to be classified.

After completing the processing in the step S1320, the image group classification unit 208 classifies the image group as follows: the image group classification unit 208 uses the image reading/writing unit 202 to create an event directory with the same name as the event name associated with the image group under the classification event directory in the image storage unit 231 corresponding to the classification event into which the image group is to be classified. The image group classification unit 208 uses the image reading/writing unit 202 to then store information, under the created event directory, indicating the addresses of data for all of the images belonging to the image group, thus creating a link to the data for all of the images belonging to the image group (step S1330).

Subsequently, the classification result output unit 210 displays, on the display 193, the classification event name of the classification event into which the image group is to be classified as calculated by the image group classification unit 208, together with the event name associated with the image group. The image data processing device 100 then ends the image group classification processing.

Specific Example

The following is a supplementary explanation of the features of the image data processing device 100 using a specific example.

Figure 14:
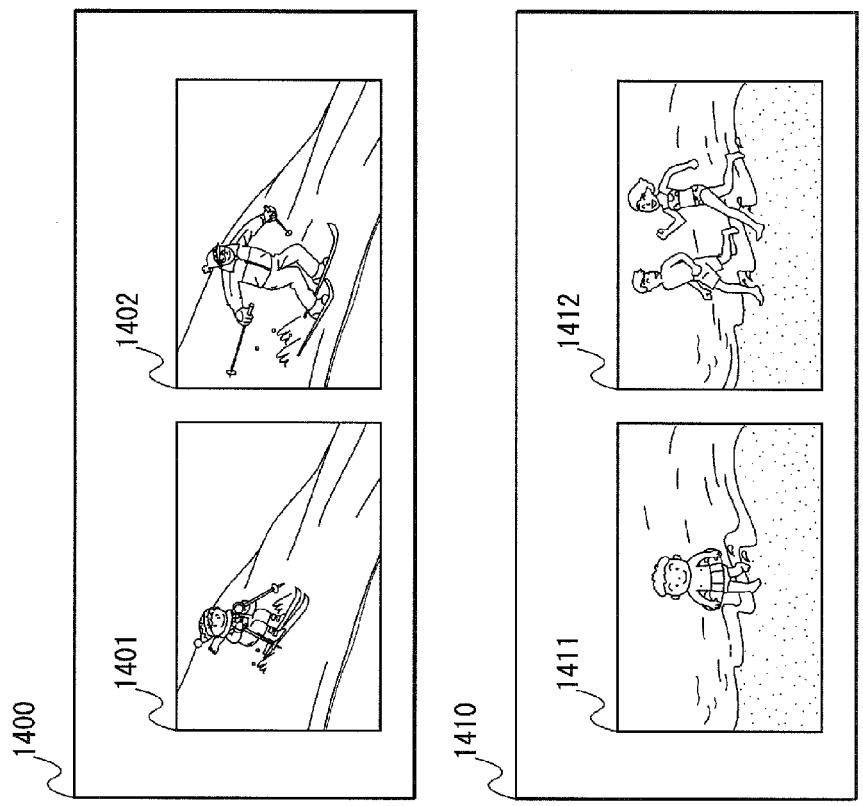
FIG. 14 illustrates image groups photographed at events in which family members participate.

FIG. 14 is examples of an image group photographed at events in which family members participate.

An image group 1400 is composed of images photographed at a ski trip in which family members participate. The image group 1400 includes an image 1401 and an image 1402 and is associated with an event name "2010 winter trip to Shinshu."

The image 1401 includes a son enjoying skiing, and the image 1402 includes a father enjoying skiing. These images include a large amount of the blue color of the sky and the white color of the snow, and are characterized in that a large amount of the white color of the snow, which is typical of the event "skiing", is included in a region around a person.

The image 1401 corresponds, for example, to the image feature information including the image ID 600 "0001" as shown in FIG. 6 and to the image family scene information including the image ID 700 "0001" as shown in FIG. 7.

The image 1402 corresponds, for example, to the image feature information including the image ID 600 "0002" as shown in FIG. 6 and to the image family scene information including the image ID 700 "0002" as shown in FIG. 7.

The image group 1400 corresponds, for example, to the image group family scene information including the image group ID 800 "001" as shown in FIG. 8.

An image group 1410 is composed of images photographed at sea bathing in which family members participate. The image group 1410 includes an image 1411 and an image 1412 and is associated with an event name "2010 summer trip to Okinawa."

The image 1411 includes a son enjoying sea bathing, and the image 1412 includes a father and a mother enjoying sea bathing. These images include a large amount of the blue color of the sea and the white color of the sand, and are characterized in that a large amount of the blue color of the sea, which is typical of the event "sea bathing", is included in a region around a person.

The image 1411 corresponds, for example, to the image feature information including the image ID 600 "0003" as shown in FIG. 6 and to the image family scene information including the image ID 700 "0003" as shown in FIG. 7.

The image 1412 corresponds, for example, to the image feature information including the image ID 600 "0004" as shown in FIG. 6 and to the image family scene information including the image ID 700 "0004" as shown in FIG. 7.

The image group 1410 corresponds, for example, to the image group family scene information including the image group ID 800 "002" as shown in FIG. 8.

When the image group family scene feature 820 (see FIG. 8) of the image group 1400 and the image group family scene feature 820 of the image group 1410 are compared, there is a significant difference between them in terms of the image group family scene blue ratio 822 and the image group family scene white ratio 824. Therefore, for example, by using the event feature information shown in FIG. 9, it is possible to classify the image group 1400 and the image group 1410 into different classification events, that is, to classify the image group 1400 into the classification event "skiing" and image group 1410 into the classification event "sea bathing."

In this way, even when images belonging to different image groups are similar to each other in terms of the features of a whole image, the image data processing device 100 classifies these image groups into different classification events by extracting the features of each image from the person around region, which is a region around a person.

Consider a case where a conventional image data processing device that extracts the features of a whole image attempts to classify the image group 1400 and the image group 1410.

When the features of images belonging to an image group are referred to as an image group scene feature, since the conventional image data processing device extracts the features of a whole image, the image group scene feature of the image group 1400 and the image group scene feature of the image group 1410 become similar to each other.

FIG. 15 shows a data structure of image group scene information generated by the conventional image data processing device.

As shown in FIG. 15, the image group scene information is composed of an image group ID 1500, an event name 1510 and an image group scene feature 1520, all of which are associated with one another.

The image group scene feature 1520 is further composed of an image group scene black ratio 1521, an image group scene blue ratio 1522, an image group scene green ratio 1523 and an image group scene white ratio 1524, all of which are associated with one another.

The image group ID 1500 is an ID identifying an image group.

In this embodiment, an image group corresponding to the image group ID 1500 "001" is the image group 1400, and an image group corresponding to the image group ID 1500 "002" is the image group 1410.

The event name 1510 is a name of the image group.

The image group scene black ratio 1521 is an average value of ratios of the number of pixels determined to be black to the total number of pixels in images belonging to the corresponding image group.

The image group scene blue ratio 1522 is an average value of ratios of the number of pixels determined to be blue to the total number of pixels in images belonging to the corresponding image group.

The image group scene green ratio 1523 is an average value of ratios of the number of pixels determined to be green to the total number of pixels in images belonging to the corresponding image group.

The image group scene white ratio 1524 is an average value of ratios of the number of pixels determined to be white to the total number of pixels in images belonging to the corresponding image group.

When the image group 1400 and the image group 1410, i.e. the image group scene feature 1520 of the image group corresponding to the image group ID 1500 "001" and the image group scene feature 1520 of the image group corresponding to the image group ID 1500 "002", are compared, there is no significant difference between them in terms of each image group scene color ratio.

It is therefore difficult for the conventional image data processing device to classify the image group 1400 and the image group 1410 into different classification events.

<Discussion on Image Including Person>

Figure 16:
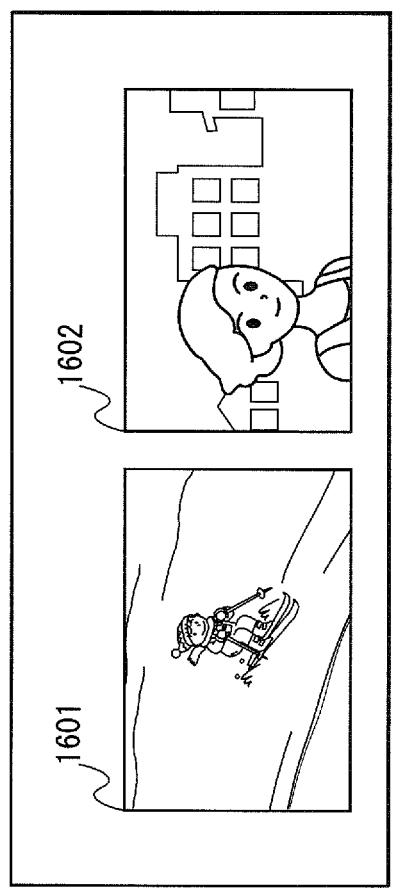
FIG. 16 illustrates two images.

FIG. 16 illustrates two images.

An image 1601 is an image photographed at a ski trip in which family members participate, and includes a son enjoying skiing. This image was photographed in consideration of an event "ski trip" in which family members participate so that the whole body of the son appears in front of a snow mountain.

The image 1602 is a close-up image of a mother photographed on the street, and includes the face of the mother on which a camera zoomed-in. This image was photographed in consideration of the face of the mother without paying any attention to a background image.

When photographing images including a person, photographers tend to photograph images so that an area of the person increase if the photographers are interested in the person, and tend to photograph images so that the area of the person decreases if the photographers are interested in a background image of the person. It is therefore considered that, when a value of the face area is high, background images tend not to represent the features of an event at which the image was photographed, and, when a value of the face area is low, background images tend to represent the features of an event at which the image was photographed.

In this embodiment, a value of each image family scene color ratio constituting the image family scene feature is calculated by dividing a value of each color ratio constituting the person around feature by a value of a corresponding face area. With this configuration, the calculated image family scene feature has been weighted such that a value of an image family scene feature of an image including a face region that is smaller in area is higher than that of an image including a face region that is larger in area.

It is therefore considered that an image family scene calculation method in this embodiment reflects the trend that, when a value of the face area is high, background images are not likely to represent the features of an event at which the image was photographed, and, when a value of the face area is low, background images are likely to represent the features of an event at which the image was photographed.

Embodiment 2

Figure 17:
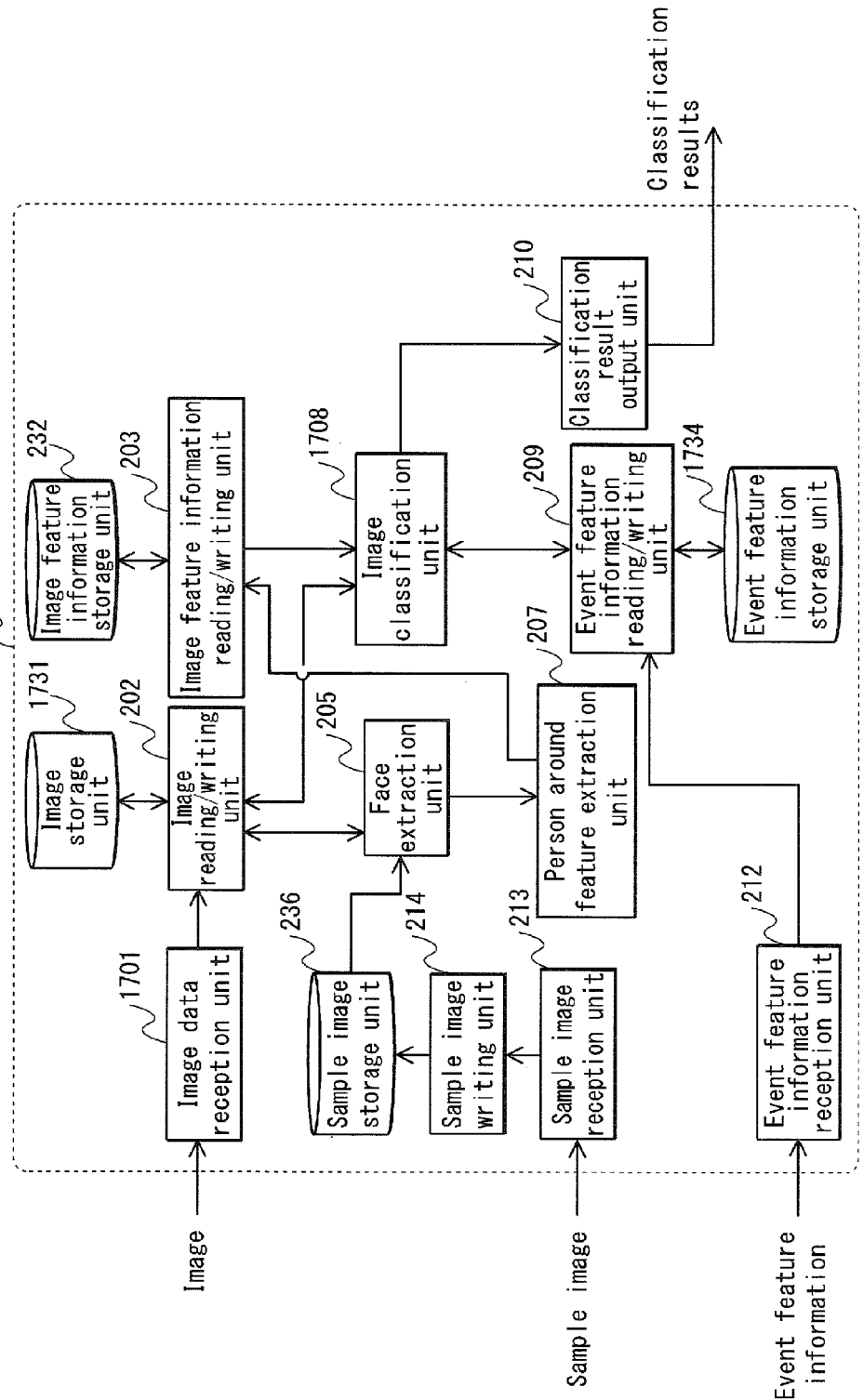
FIG. 17 is a functional block diagram illustrating a functional configuration of an image data processing device 1700.

As an embodiment of an image data processing device according to the present invention, the following describes an image data processing device 1700, which is a modification to a portion of the image data processing device 100 described in Embodiment 1, with reference to FIG. 17.

The hardware configuration of the image data processing device 1700 is the same as that of the image data processing device 100 described in Embodiment 1, but a portion of a program executed by the image data processing device 1700 is different from that executed by the image data processing device 100 described in Embodiment 1.

The image data processing device 100 described in Embodiment 1 is an example of a device that classifies images in units of image groups, but the image data processing device 1700 described in Embodiment 2 is an example of a device that classifies images in units of images. That is to say, the image data processing device 1700 calculates a person around feature indicating a feature of pixels around a person appearing in an image, and, based on the calculated person around feature, classifies the image into any of different classification events.

The following describes the configuration of the image data processing device 1700 described in Embodiment 2, focusing on a difference from the configuration of the image data processing device 100 described in Embodiment 1, with reference to the drawings.

<Configuration>

<Hardware Configuration of Image Data Processing Device 1700>

The hardware configuration of the image data processing device 1700 is the same as that of the image data processing device 100 described in Embodiment 1. Accordingly, a description thereof is omitted.

<Functional Configuration of Image Data Processing Device 1700>

FIG. 17 is a functional block diagram illustrating main functional blocks of the image data processing device 1700.

As illustrated in FIG. 17, the image data processing device 1700 is different from the image data processing device 100 described in Embodiment 1 in that the family scene information reading/writing unit 204, the family scene information calculation unit 206, the event name information reception unit 211 and the family scene information storage unit 233 are removed, and the image group data reception unit 201, the image group classification unit 208, the image storage unit 231 and the event feature information storage unit 234 are respectively replaced with an image data reception unit 1701, an image classification unit 1708, an image storage unit 1731 and an event feature information storage unit 1734.

The function of the image data reception unit 1701 is a partial modification of the function of the image group data reception unit 201 described in Embodiment 1. The image data reception unit 1701 is implemented by the CPU 101 executing a program and connects with the image reading/writing unit 202. The image data reception unit 1701 has a function to receive, from a user, a designation of one image and read the designated image, and a function to assign an image ID to the designated image in order to identify the designated image when reading the designated image.

The image data reception unit 1701 reads an image from an external recording medium via the external recording medium reading/writing device 140, from an external device via the USB control device 150, or from an external communication device via the communication device 180.

The image classification unit 1708 is implemented by the CPU 101 executing a program. The function of the image classification unit 1708 is a partial modification of the function of the image group classification unit 208 described in Embodiment 1. The image classification unit 1708 connects with the image reading/writing unit 202, the image feature information reading/writing device 203, the event feature information reading/writing unit 209 and the classification result output unit 210. The image classification unit 1708 has a function to classify images into classification events based on the image feature information stored in the image feature information storage unit 232 and the event feature information stored in the event feature information storage unit 234.

A method of classifying images performed by the image classification unit 1708 is detailed later in the section <Image Classification Processing>.

The directory structure of the image storage unit 1731 is a partial modification of the directory structure of the image storage unit 231 described in Embodiment 1. The image storage unit 1731 connects with the image reading/writing unit 202.

Figure 18:
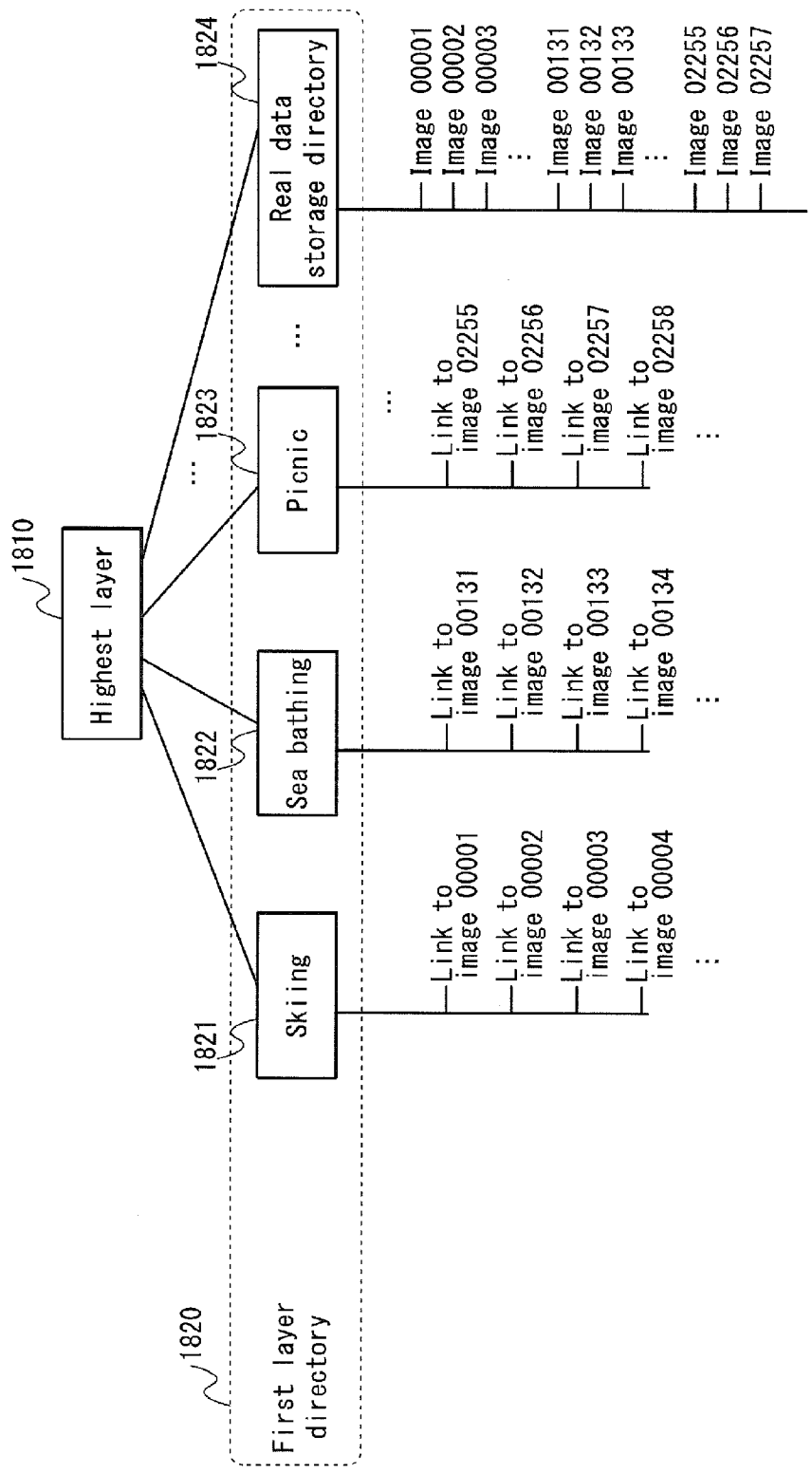
FIG. 18 shows a directory structure of an image storage unit 1731.

FIG. 18 shows the directory structure of the image storage unit 1731.

As shown in FIG. 18, the image storage unit 1731 has the directory structure composed of two layers: a highest layer 1810 and a first directory layer 1820.

The first directory layer 320 includes a plurality of classification event directories, such as a skiing directory 1821, a sea bathing directory 1822 and a picnic directory 1823, as well as a real data storage directory 1824.

The real data storage directory 324 is a directory for storing image data. Image data is stored only in the real data storage directory 324.

The classification event directories here are directories having the same name as the classification events into which images are classified. No two directories have the same name.

Each classification event directory stores information indicating the addresses of image data pieces classified into a classification event having the same name as the classification event directory. The classification event directory thus links to the image data.

Returning to FIG. 17 again, the functional structure of the image data processing device 1700 is now further described.

The event feature information stored in the event feature information storage unit 1734 is a partial modification of the event feature information stored in the event feature information storage unit 234 described in Embodiment 1. The event feature information storage unit 1734 connects with the event feature information reading/writing unit 209.

FIG. 19 shows an example of a data structure of the event feature information stored in the event feature information storage unit 1734.

As shown in FIG. 19, in the event feature information, image group family scene black ratio 0.5 or more 1901, image group family scene blue ratio 0.5 or more 1902, image group family scene green ratio 0.5 or more 1903 and image group family scene white ratio 0.5 or more 1904, which are examples of a classification condition 1900, are respectively associated with fireworks 1911, sea bathing 1912, picnic 1913 and skiing 1914, which are examples of a classification event 1910.

With reference to the drawings, the following describes the operations of the image data processing device 1700 having the above configuration.

<Operations>

The image data processing device 1700 performs, as characteristic operations, modified image feature information generation processing and image classification processing.

The following describes each operation with reference to the drawings.

<Modified Image Feature Information Generation Processing>

The image feature information generation processing, which is performed by the image data processing device 1700, is processing to read an image and to generate the image feature information with respect to the read image.

Figure 20:
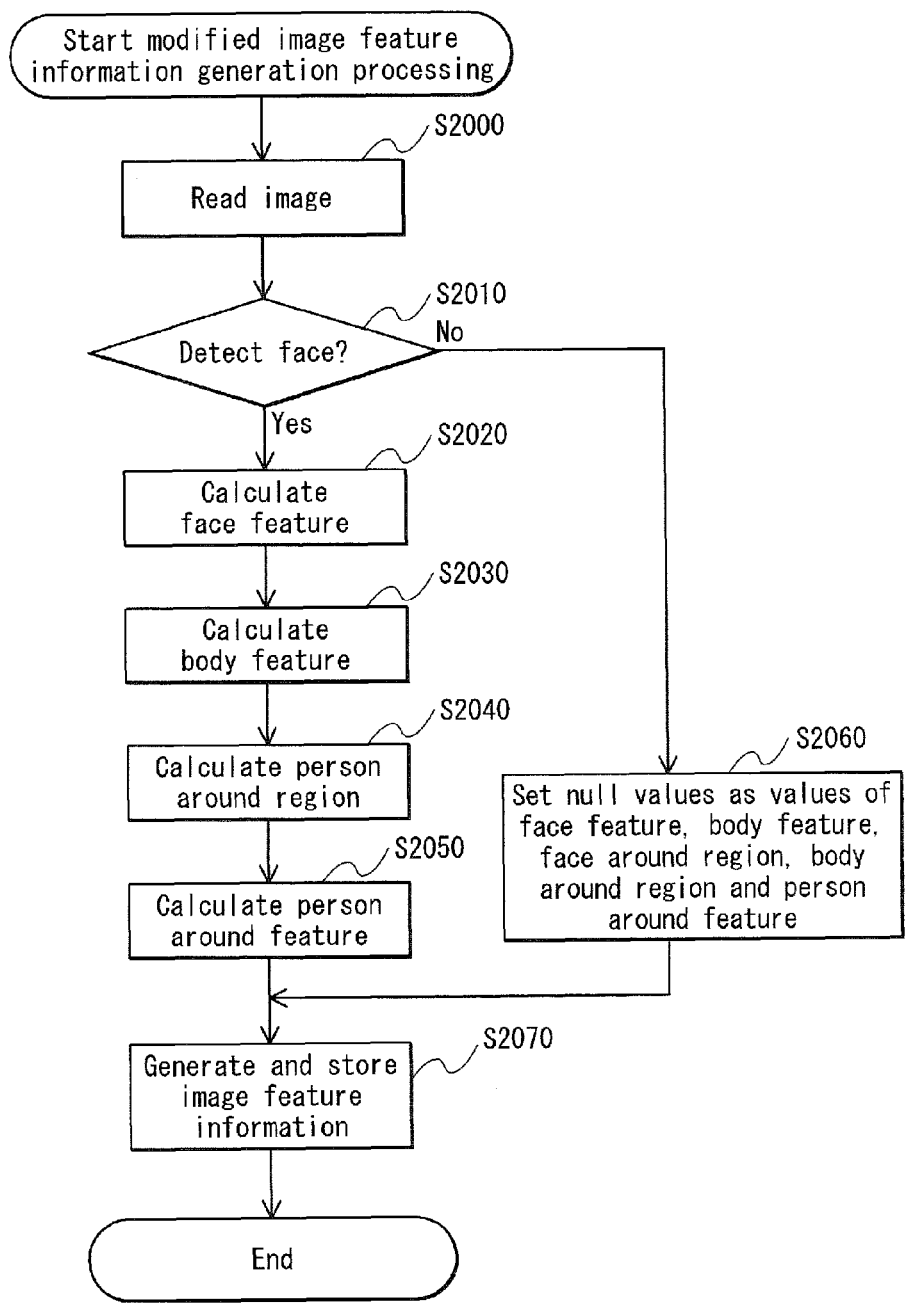
FIG. 20 is a flow chart of modified image feature information generation processing.

FIG. 20 is a flow chart of the modified image feature information generation processing performed by the image data processing device 1700.

The modified image feature information generation processing starts when the remote control 197 receives a user operation indicating to start the modified image feature information generation processing.

When the modified image feature information generation processing starts, the image data reception unit 1701 starts reading an image (step S2000.)

The image data reception unit 1701 reads an image from an external recording medium mounted in the external recording medium reading/writing device 140, from an external device via the USB cable 195 connected to the USB control device 150, or from the communication device 180 connected to the network 194.

In this embodiment, the image data reception unit 1701 reads, from the external recording medium reading/writing device 140, an image recorded on the SD memory card 191 that is an external recording medium.

The image data reception unit 1701 reads the image recorded on the SD memory card 191, assigns a unique image ID to the read image to associate image data with the image ID and uses the image reading/writing unit 202 to write the image to the real data storage directory 1824 of the image storage unit 1731.

After the image is written into the image storage unit 1731, the face extraction unit 205 uses the image reading/writing unit 202 to read the image received by the image group data reception unit 201 from the image storage unit 231 and decodes the read image in the JPEG format.

By referring to the stored face models, the face extraction unit 205 attempts to recognize any faces included in the read image (step S2010.)

When recognizing any faces (step S2010: Yes), the face extraction unit 205 calculates a face feature for each recognized face (step S2020.) That is to say, the face extraction unit 205 calculates an area of a region of each recognized face and a position of the recognized face, sequentially assigns face IDs each identifying a recognized face to respective recognized faces, extracts features of each recognized face and features of faces appearing in sample images stored in the sample image storage unit 236, and, when the sample images stored in the sample image storage unit 236 include a sample image including a face having the same features as those of the recognized face, assigns a corresponding face ID of the sample image to a corresponding face ID of the recognized face. When the sample image storage unit 236 does not include a sample image including a face having the same features as those of the recognized face, the face extraction unit 205 assigns a value "99" meaning that the recognized face is a face of a non-family member to a corresponding face ID of the recognized face.

After completing the processing in the step S2020, the face extraction unit 205 calculates a body region positioned below the region of the recognized face, and calculates a body feature for each calculated body region (step S2030.) That is to say, the face extraction unit 205 calculates an area and a position of the calculated body region, and sequentially assigns body IDs each identifying a calculated body region to respective calculated body regions.

After completing the processing in the step S2030, the person around feature extraction unit 207 calculates the face around region based on the face region, the body around region based on the body region, and the person around region from the calculated face around region and body around region (step S2040.)

The person around feature extraction unit 207 further calculates the person around feature based on a value of each pixel in the person around region (step S2050.) That is to say, the person around feature extraction unit 207 determines the color of each pixel in the person around region based on the brightness of each of color components R, G and B in the pixel. The person around feature extraction unit 207 calculates, for each of the determined colors, the ratio of the number of pixels of the determined color to the total number of pixels in the person around region as a color ratio of the determined color.

When the face extraction unit 205 does not recognize any faces in the processing in the step S2010 (step S2010: No), the face extraction unit 205 sets a null value as a value of each component of the face feature and a value of each component of the body feature, and the person around feature extraction unit 207 sets a null value as a value of the face around region, a value of the body around region and a value of each component of the person around feature (step S2060.)

After completing the processing in the step S2050 or the step S2060, the person around feature extraction unit 207 generates the image feature information with respect to a target image, and uses the image feature information reading/writing unit 203 to store the generated image feature information in the image feature information storage unit 1732 (step S2070.) The image data processing device 1700 then ends the modified image feature information generation processing.

<Image Classification Processing>

The image classification processing, which is performed by the image data processing device 1700, is processing to classify images into the classification events.

Figure 21:
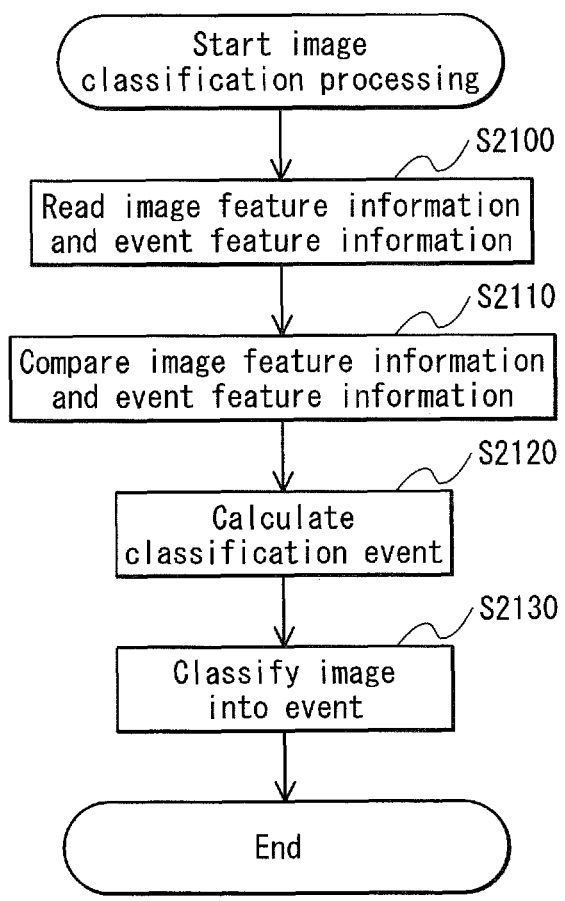
FIG. 21 is a flow chart of image classification processing.

FIG. 21 is a flow chart of the image classification processing performed by the image data processing device 1700.

The image group classification processing starts when the image data processing device 1700 ends the modified image feature information generation processing.

When the image classification processing starts, the image classification unit 1708 uses the image feature information reading/writing unit 203 to read, from the image feature information storage unit 232, the image feature information for the image processed in the modified image feature information generation processing, and uses the event feature information reading/writing unit 209 to read the event feature information from the event feature information storage unit 1734 (step S2100.)

After completing the processing in the step S2100, the image classification unit 1708 compares the read image feature information and the read event feature information (step S2110), and calculates the classification event into which the image is to be classified (step S2120.) That is to say, the image classification unit 1708 verifies whether or not any color ratio (see FIG. 6) included in the image feature information meets the classification condition 1900 (see FIG. 19) included in the event feature information. If any color ratio meeting the classification condition 1900 included in the event feature information is found, the image classification unit 1708 calculates the classification event 1910 corresponding to the classification condition 1900 as a classification event into which the image is to be classified. If any color ratio meeting the classification condition 1900 included in the event feature information is not found, the image classification unit 1708 calculates a classification event "other events" as a classification event into which the image is to be classified.

If the color ratio included in the image feature information is set as a null value, the image classification unit 1708 calculates the classification event "other events" as a classification event into which the image is to be classified.

If a plurality of classification conditions 1900 are met, all the classification events 1910 corresponding to the met classification conditions 1900 are calculated as the classification events into which the image is to be classified.

After completing the processing in the step S2120, the image classification unit 1708 classifies the image as follows: the image classification unit 1708 uses the image reading/writing unit 202 to store information indicating the address of data for the image under the classification event directory in the image storage unit 1731 corresponding to a classification event into which the image is to be classified, thus creating a link to the data for the image (step S2130).

Subsequently, the classification result output unit 210 displays, on the display 193, the classification event name of the classification event into which the image is to be classified as calculated by the image group classification unit 208, together with the event name associated with the image group. The image data processing device 1700 then ends the image classification processing.

<Supplementary Description>

While an example of an image data processing device that classifies images has been described in Embodiment 1 and in Embodiment 2 for embodiments of an image data processing device according to the present invention, the image data processing device may be modified as follows. The present invention is of course not limited to an image data processing device exactly as described in the above embodiments.

(1) In Embodiment 1, the image data processing device 100 stores therein an image as data encoded in the JPEG format. Alternatively, as long as a digital photograph can be stored as data, the digital photograph may be encoded in a format other than the JPEG format, such as the PNG (Portable Network Graphics) format or the GIF (Graphics Interchange Format), or the digital photograph may be unencoded bit-map data.

Furthermore, a digital photograph is used as an example of content. Alternatively, as long as an image can be stored as digital data, the image may be data of a scanned painting, for example.

(2) In Embodiment 1, the CPU 101, the ROM 102, the RAM 103, the hard disk device interface 104, the external recording medium reading/writing device interface 105, the USB control device interface 106, the output device interface 107, the input device interface 108, the communication device interface 109, the decoder 111, and the bus line 120 are integrated into the system LSI 110. As long as the same function as the function of the system LSI 110 is achieved, however, integration into one LSI is not required and, for example, a plurality of integrated circuits may be used.

(3) In Embodiment 1, the decoder 111 is implemented by a DSP. Alternatively, as long as a function to decode encoded data is provided, the decoder 111 does not necessarily need to be implemented by a DSP. For example, the CPU 101 may function also as the decoder 111. Alternatively, another CPU or a dedicated circuit composed of an ASIC or the like may be used.

(4) In Embodiment 1, the input device 170 has a function to receive an operation command transmitted wirelessly from a user via the remote control 197. Alternatively, as long as a function to receive an operation command from a user is provided, the input device 170 is not required to have the function to receive an operation command transmitted wirelessly via the remote control 197. For example, the input device 170 may include a keyboard and a mouse and have a function to receive an operation command from a user via the keyboard and the mouse, or may include buttons and have a function to receive an operation command from a user via the buttons.

(5) In Embodiment 1, the image group data reception unit 201 receives a designation of two or more images and reads the designated images as images belonging to the same image group. Alternatively, as long as a correspondence can be established between images and an image group, the following structure may be employed. For example, the image group data reception unit 201 may receive image data and a list of images belonging to an image group and establish a correspondence between images and the image group based on the received list.

(6) In Embodiment 1, the image group data reception unit 201 sequentially assigns image IDs to read images. Alternatively, as long as image IDs are assigned to images in one-to-one correspondence, the image IDs do not necessarily need to be sequentially assigned.

(7) In Embodiment 1, the face models are, for example, information on the brightness of a part of a human face such as eyes, nose, or mouth, relative positional relations between these parts, and the like. As long as a face can be recognized, however, other information, such as features calculated using a Gabor filter or other face features, such as eye color, a position of a mole, skin color, or the like may be used. Alternatively, the face models may be any combination of information representing a plurality of face features.

(8) In Embodiment 1, primary colors specified by the person around feature extraction unit 207 are black, blue, green, and white. Alternatively, colors to be specified may be, for example, red, yellow, or other colors. As a color space, RGB, L*a*b, or the like may be used.

(9) In Embodiment 1, the person around feature is calculated based on colors included in an image. As long as the person around feature indicates the feature of the image, the person around feature is not required to be calculated based on colors included in an image. Alternatively, the person around feature may be calculated based, for example, on the brightness, the texture feature, or an object appearing in the image.

(10) In Embodiment 1, an example in which the person around feature extraction unit 207 calculates the person around feature based on each pixel in the person around region has been described. As long as the person around feature is calculated so that values of pixels in a given region around the face region are reflected in the person around feature more than values of pixels not in the given region around the face region, however, the person around feature is not required to be calculated based on each pixel in the person around region.

Considered as an example is a case where the person around feature extraction unit 207 calculates the person around feature based on a pixel value weighted according to a distance from the face region so that a value of a pixel closer to the face region is higher than a value of a pixel remote from the face region.

(11) In Embodiment 1, the person around region is a region obtained by removing the face region and the body region from a region included in at least one of the face around region and the body around region. As long as the person around region is a given region around the face region, however, the person around region is not required to be a region obtained by removing the face region and the body region from a region included in at least one of the face around region and the body around region. For example, the person around region may be a region obtained by removing the face region from the face around region, may be the body region itself, or may be a region obtained by adding the body region to a region obtained by removing the face region from the body around region.

A shape of the person around region is not limited to a rectangular shape. For example, the person around region may be hexagonal or circular in shape.

(12) In Embodiment 1, the face around region is a rectangular region defined by a line obtained by adding a horizontal width of the face region to each of left and right sides of the face region and a line obtained by adding a vertical width of the face region to an upper side of the face region. As long as the face around region is a given region around the face region, however, the face around region is not limited to the rectangular region defined by a line obtained by adding a horizontal width of the face region to each of left and right sides of the face region and a line obtained by adding a vertical width of the face region to an upper side of the face region. For example, the face around region may be a region defined by a line obtained by adding a half horizontal width of the face region to each of left and right sides of the face region and a line obtained by adding a half vertical width of the face region to each of upper and lower sides of the face region. Furthermore, the face around region may not be rectangular in shape.

(13) In Embodiment 1, an example in which the region of each recognized face is a rectangular region having the smallest area of all rectangular regions including the recognized face and defined by horizontal and vertical lines in an image has been described. As long as the face region includes the recognized face, however, the face region is not limited to the rectangular region having the smallest area of all rectangular regions including the recognized face and defined by horizontal and vertical lines in an image. For example, the face region may be a region enclosed by a curve along an outline of the recognized face.

(14) In Embodiment 1, the body region is a rectangular region positioned below a region of each recognized face and defined by a line 1.5 times longer than the horizontal width of the face region and a line 2 times longer than the vertical width of the face region. As long as the body region is a region that is estimated to include the body, however, the body region is not limited to the region positioned below the face region and defined by a line 1.5 times longer than the horizontal width of the face region and a line 2 times longer than the vertical width of the face region. For example, the body region may be a region positioned below the face region and defined by a line 2 times longer than the horizontal width of the face region and a line 1.5 times longer than the vertical width of the face region. Alternatively, the body region may be a region indicated by the body recognized through image recognition processing. Furthermore, the body region may not be rectangular in shape.

(15) In Embodiment 1, the body around region is a rectangular region defined by a line obtained by adding a horizontal width of the face region to each of left and right sides of the body region and a line obtained by adding a vertical width of the face region to each of upper and lower sides of the body region. As long as the body around region is a given region around the body region, however, the body around region is not limited to the rectangular region defined by a line obtained by adding a horizontal width of the face region to each of left and right sides of the body region and a line obtained by adding a vertical width of the face region to each of upper and lower sides of the body region. For example, the body around region may be a region defined by a line obtained by adding a half horizontal width of the body region to each of left and right sides of the body region and a line obtained by adding a vertical width of the body region to each of upper and lower sides of the body region. Furthermore, the body around region may not be rectangular in shape.

(16) In Embodiment 1, the image family scene feature is calculated by dividing a value of each color ratio constituting the person around feature by a value of the face area. As long as the calculated image family scene feature has been weighted such that a value of an image family scene feature of an image including a face region that is smaller in area is higher than that of an image including a face region that is larger in area, however, the image family scene feature is not required to be calculated by dividing a value of each color ratio constituting the person around feature by a value of the face area. For example, the image family scene feature may be calculated by dividing a value of each color ratio constituting the person around feature by the sum of a value of the face area and a value of the body area.

(17) In Embodiment 1, the image group family scene feature is calculated as an average value of image family scene features of images each including a face recognized as a family member. As long as the image group family scene feature is calculated without including a image family scene feature of an image not including the recognized face, however, the image group family scene feature is not required to be calculated as an average value of image family scene features of images each including a face recognized as a family member. For example, the image group family scene feature may be calculated as an average value of image family scene features of all the images each including the recognized face, or as an average value of image family scene features of images each including a recognized face of a specific person.

Furthermore, the image group family scene feature may not be calculated as an average value of image family scene features of images belonging to a corresponding image group and may be weighted according to a recognized face included in each image. For example, considered are a case where the image group family scene feature is calculated by weighting an image including a larger number of recognized faces each having the same feature as that of any of faces included in the images stored in the image storage unit 231 and a case where the image group family scene feature is calculated by weighting an image including a specific person determined in advance.

(18) In Embodiment 1, the image group classification unit 208 classifies image groups based on the image group family scene information and the event feature information. As long as image groups are classified at least based on the image group family scene information, however, image groups are not required to be classified based on the event feature information. For example, the image group classification unit 208 may learn the image group family scene information as a teacher and classify image groups based on the results of the learning. The image group classification unit 208 may learn the image group family scene information, for example, by using a learning model, such as a logistic regression analysis method or an SVM (Support Vector Machine) method.

(19) In Embodiment 1, when a corresponding face ID corresponding to the recognized face indicates a family member, a person having the recognized face is specified as a family member. As long as a person having the recognized face is specified as a family member when the recognized face is analogized as a family member's face, however, a person having the recognized face is not required to be specified as a family member when a corresponding face ID corresponding to the recognized face indicates a family member. For example, when the predetermined number (e.g. ten) or more of images each including a face having the same feature as the recognized face are stored in the image storage unit 231, a person having the recognized face may be specified as a family member.

(20) In Embodiment 1, when one image includes a plurality of recognized faces, the person around feature extraction unit 207 calculates one person around region. As long as at least one person around region is calculated, however, the number of calculated person around regions is not limited to one.

By way of example, considered is a case where the person around region is calculated for each recognized face and the person around feature is calculated for each person around region.

When a plurality of person around features are calculated for each image, there are various possible methods for calculating the image family scene feature of the image.

For example, the following methods are considered: a method of calculating, for each person around feature, an image family scene feature of a corresponding person (hereinafter, referred to as a "person around image family scene feature"), and calculating an average value of the calculated person around image family scene features as the image family scene feature of an image; a method of calculating the image family scene feature only from person around information with respect to a person identified by a specific face ID; a method of calculating the image family scene feature from person around information with respect to a person at a specific position (e.g. a center of an image or a right side of an image); and a method of calculating the image family scene feature by weighting each person around image family scene feature in accordance with a priority set in advance.

(21) In Embodiment 1, the sample image storage unit 236 stores image data of an image including a specific person. As long as the sample image storage unit 236 stores data from which the face extraction unit 205 extracts features of the face of a specific person, the sample image storage unit 236 is not required to store an image including a specific person. For example, the sample image storage unit 236 may store features of the face of a specific person themselves.

(22) In Embodiment 1, upon determining a classification event into which an image group is to be classified, the image group classification unit 208 creates an event directory having the same name as an event corresponding to the image group under an event directory corresponding to the classification event into which the image group is to be classified. Then, the image group classification unit 208 provides a link to image data for all the images belonging to the image group to the created event directory, thereby to classify the image group into the classification event. As long as the images belonging to the image group correspond to the same classification event, however, the image group classification 208 is not required to classify the image group by providing a link. For example, a tag for identifying the classification event may be assigned to the images belonging to the image group.

(23) In Embodiment 1, the image data processing device 100 classifies image groups based on the image group family scene information and the event feature information. As long as image groups are classified at least based on the image group family scene information and the event feature information, however, image groups are not required to be classified based only on the image group family scene information and the event feature information.

By way of example, considered is a case where the image data processing device 100 further has a function to calculate, based on features of a whole image, image group scene feature information indicating features of images belonging to an image group, and image groups are classified based on the calculated image group scene feature information, the image group family scene information and the event feature information. In this case, for example, the image data processing device 100 may perform classification in two stages; the image data processing device 100 perform classification based on the image group scene feature information and the event feature information in the first stage and perform detailed classification based on the image group family scene information and the event feature information in the second stage.

(24) In Embodiment 1, if a plurality of classification conditions 900 are met, the image group classification unit 208 calculates all the classification events 910 corresponding to the met classification conditions 900 as classification events into which an image group is to be classified. As long as at least one classification event into which an image group is to be classified is calculated, however, all the classification events 910 corresponding to the met classification conditions 900 are not required to be calculated as classification events into which an image group is to be classified.

As an example of a method for calculating a classification event into which an image group is to be classified, considered is a method by which the image group classification unit 208 calculates, as the classification event into which an image group is to be classified, a classification event corresponding to a classification condition met by the highest image group family scene color ratio of all the image group family scene color ratios meeting the classification conditions 900.

(25) Furthermore, the present invention may be a server device that provides a method described in the above-mentioned embodiments as a network service. In this case, the image data processing device is the server device that provides a network service. When receiving, over a network, content from an AV device, a personal computer, a digital camera or the like storing the content, the server device performs image data processing with respect to the received content using the method described in the above-mentioned embodiments and transmits, over the network, the results of the processing to the AV device, the personal computer, the digital camera or the like. Note that the results of the processing may be transmitted to a device from which the content is received or other devices. Specifically, examples of the other devices are another device possessed by a user of the device from which the content is received, a device possessed by a family member or a friend of the user of the device from which the content is received and a server device that provides a network service such as an SNS and an image sharing service. Instead of transmitting the results of the processing or in addition to transmitting the results of the processing, the results of the processing may be stored in the server device itself that provides the method described in the above-mentioned embodiments as a network service.

(26) A control program, which is composed of program code for causing the CPU of the image data processing device and various circuits connected with the CPU to execute the image group classification operations and the like described in Embodiments 1 and 2, can be recorded on a recording medium or distributed via various types of communication channels and the like. These types of recording media include an IC card, a hard disk, an optical disc, a flexible disk and a ROM. The distributed control program may be provided for use by being stored in a memory or the like read by the CPU, and the various functions described in the embodiments may be realized by the CPU executing the control program. Part of the control program may be transmitted to another program executable device (CPU) different from the image classification device via various types of communication channels, and the program executable device may execute the part of the control program.

(27) The following describes the configuration, modifications and effects of an image data processing device according to an embodiment of the present invention.

(a) An image data processing device according to an embodiment of the present invention is an image data processing device that calculates image feature information for classifying images, comprising: a face specification unit configured to specify a face region included in an image; and an image feature calculation unit configured to calculate image feature information for the image from an image feature calculated based on at least some pixels in the image, wherein the image feature information is calculated such that the image feature calculated based on pixels in a given region around the face region is reflected in the image feature information more than the image feature calculated based on pixels other than the pixels in the given region.

When photographing images each including a person's face at a certain event, photographers tend to photograph images so that the features of the event appear in a region around the person's face. For example, photographers tend to photograph images at sea bathing so that the blue color of the sea appears in a region around a person's face and to photograph images at a ski trip so that the white color of the snow appears in a region around a person's face.

The image data processing device in this embodiment having the above-mentioned configuration extracts the image feature information by placing a greater importance on an image feature calculated based on pixels in a region around a person's face, which tends to represent the features of an event, than on an image feature calculated based on pixels in a region remote from a person's face, which tends not to represent the features of an event. With this configuration, the image data processing device according to the present invention can calculate the image feature information that reflects the features of the event more than that calculated by a conventional image data processing device.

Therefore, the image data processing device according to the present invention can improve the precision of classification when images are classified using the image feature information calculated by the image data processing device according to the present invention, compared to the conventional image data processing device.

Figure 22:
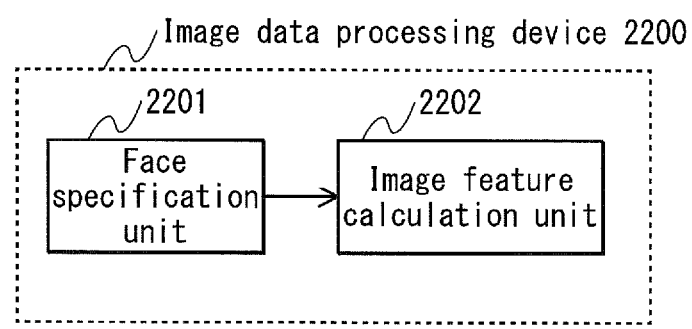
FIG. 22 is a functional block diagram illustrating a functional configuration of an image data processing device 2200.

FIG. 22 is a functional block diagram illustrating a functional configuration of an image data processing device 2200 in the above-mentioned modification.

The image data processing device 2200 calculates the image feature information for classifying images. As illustrated in FIG. 22, the image data processing device 2200 includes a face specification unit 2201 and an image feature calculation unit 2202.

The face specification unit 2201 connects with the image feature calculation unit 2202 and has a function to specify the face region included in an image. By way of example, the face specification unit 2201 is implemented as the face extraction unit 205 in Embodiment 1.

The image feature calculation unit 2202 connects with the face specification unit 2201 and has a function to calculate the image feature information for an image from an image feature calculated based on at least some pixels in the image. The image feature calculation unit 2202 is characterized by calculating the image feature information so that an image feature calculated based on pixels in a given region around the face region specified by the face specification unit 2201 is reflected in the image feature information more than an image feature calculated based on pixels not in the given region. By way of example, the image feature calculation unit 2202 is implemented as the person around feature extraction unit 207 in Embodiment 1.

(b) The image feature information may be calculated from the image feature calculated based on pixels other than pixels in the face region and pixels not in the given region.

With this configuration, the image feature calculated based on the pixels in the face region and the image feature calculated based on the pixels not in the given region are not reflected in the image feature information.

(c) The face region may be a rectangular region that includes a face and is defined by horizontal and vertical lines in the image, and the given region may be an expanded face region that is rectangular and is obtained by expanding the face region at least upwards, rightwards and leftwards in the image according to a predetermined algorithm.

With this configuration, the face region and the given region around the face are each specified by using coordinates of two opposing corners of a rectangle.

(d) An image data processing device according to an embodiment of the present invention is an image data processing device that calculates image feature information for classifying images, comprising: a face specification unit configured to specify a face region included in an image; an image feature calculation unit configured to calculate image feature information for the image from an image feature calculated based on at least some pixels in the image; and a body specification unit configured to specify, as a body region, a region positioned below the face region and determined relative to the face region according to a predetermined algorithm, wherein the image feature information is calculated such that the image feature calculated based on pixels in the body region is reflected in the image feature information more than the image feature calculated based on pixels other than the pixels in the body region.

When photographing images each including a person's face at a certain event, photographers tend to photograph images so that the features of the event appear in a region around the person's face. For example, photographers tend to photograph images at sea bathing so that the blue color of the sea appears in a region around a person's body and to photograph images at a ski trip so that the white color of the snow appears in a region around a person's body.

The image data processing device in this embodiment having the above-mentioned configuration extracts the image feature information by placing a greater importance on an image feature calculated based on pixels in a region around a person's body, which tends to represent the features of an event, than on an image feature calculated based on pixels in a region remote from a person's body, which tends not to represent the features of an event. With this configuration, the image data processing device according to the present invention can calculate the image feature information that reflects the features of the event more than that calculated by a conventional image data processing device.

Therefore, the image data processing device according to the present invention can improve the precision of classification when images are classified using the image feature information calculated by the image data processing device according to the present invention, compared to the conventional image data processing device.

Figure 23:
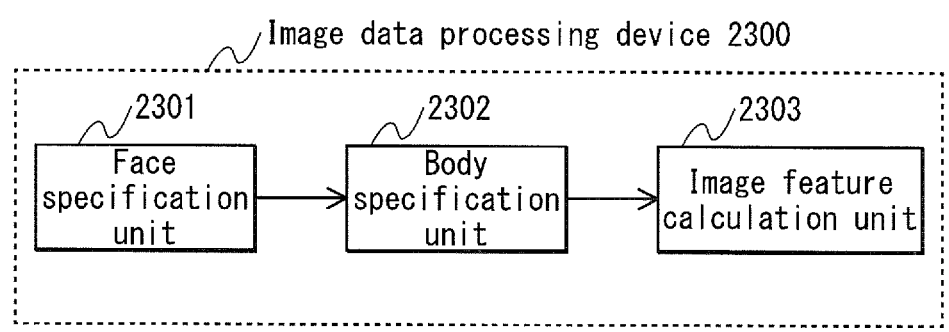
FIG. 23 is a functional block diagram illustrating a functional configuration of an image data processing device 2300.

FIG. 23 is a block diagram illustrating a functional configuration of an image data processing device 2300 in the above-mentioned modification.

The image data processing device 2300 calculates the image feature information for classifying images. As illustrated in FIG. 23, the image data processing device 2300 includes a face specification unit 2301, a body specification unit 2302 and an image feature calculation unit 2303.

The face specification unit 2301 connects with the body specification unit 2302 and has a function to specify the face region included in an image. By way of example, the face specification unit 2301 is implemented as a part of the face extraction unit 205 in Embodiment 1 achieving Functions 1 and 2.

The body specification unit 2302 connects with the face specification unit 2301 and the image feature calculation unit 2303 and has a function to specify, as a body region, a region positioned below the face region specified by the face specification unit 2301 and determined relative to the face region according to a predetermine algorithm. By way of example, the body specification unit 2302 is implemented as a part of the face extraction unit 205 in Embodiment 1 achieving Function 3.

The image feature calculation unit 2303 connects with the body specification unit 2302 and has a function to calculate the image feature information for an image from an image feature calculated based on at least some pixels in the image. The image feature calculation unit 2303 is characterized by calculating the image feature information so that an image feature calculated based on pixels in a body region specified by the body specification unit 2302 is reflected in the image feature information more than an image feature calculated based on pixels not in the body region. By way of example, the image feature calculation unit 2303 is implemented as a part of the person around feature extraction unit 207 in Embodiment 1 achieving Functions 4 and 5.

(e) The image feature information may be calculated from the image feature calculated based only on the pixels in the body region.

With this configuration, any pixels other than pixels in the body region are not reflected in the image feature.

(f) The body region may include an expanded body region obtained by removing the face region from a region obtained by expanding the body region at least upwards, rightwards and leftwards in the image according to a predetermined algorithm.

With this configuration, a region around the body of a person corresponding to a body region is included in the body region.

(g) When the face specification unit specifies first and second face regions included in an image, the image feature information may be calculated from the image feature calculated based on pixels other than pixels in the first face region, pixels in the second face region and pixels not in at least one of a given region around the first face region and a given region around the second face region.

With this configuration, when the first and second face regions are included in the image, both of values of the pixels in the first face region and values of the pixels in the second face region are not reflected in the image feature information.

(h) When the body specification unit specifies first and second body regions included in an image, the image feature information may be calculated from the image feature calculated based on pixels in at least one of the first and second body regions.

With this configuration, when the first and second body regions are included in the image, both of values of the pixels in the first body region and values of the pixels in the second body region are reflected in the image feature information.

(i) The image data processing device may further comprise an image group feature calculation unit configured to calculate image group feature information for classifying an image group based on the image feature information for each of two or more images belonging to the image group, wherein the face specification unit may further be configured to calculate face area information indicating an area ratio of the face region to the entire image, and when the area ratio indicated by the face area information for a first image is smaller than the area ratio indicated by the face area information for a second image, the image group feature calculation unit may calculate the image group feature information such that the image feature information for the first image is reflected in the image group feature information more than the image feature information for the second image.

With this configuration, image group feature information for classifying images in units of image groups is calculated such that image feature information for an image including a face region that is smaller in area is more reflected in the image group feature information than that of an image including a face region that is larger in area.

(j) The image data processing device may further comprise an image group classification unit configured to classify the image group into one of a plurality of categories, wherein the image group may be classified based on reference information indicating, for each of the categories, a range of a feature indicated by the image group feature information, and the image group feature information.

With this configuration, images are classified in units of image groups.

(k) The image feature information may include information relating to a color included in the image, the image group feature information may include information relating to a color included in images belonging to the image group, the reference information may include color reference information indicating, for each of the categories, a range of a color feature indicated by the image group feature information, and the image group may be classified based on the color reference information and the information relating to a color included in the image group feature information.

With this configuration, images are classified in units of image groups based on the information relating to a color.

INDUSTRIAL APPLICABILITY

The image data processing device according to the present invention is widely applicable to devices having a function to store a plurality of digital images.

REFERENCE SIGNS LIST 100 image data processing device
201 image group data reception unit
202 image reading/writing unit
203 image feature information reading/writing unit
204 family scene information reading/writing unit
205 face extraction unit
206 family scene information calculation unit
207 person around feature extraction unit
208 image group classification unit
209 event feature information reading/writing unit
210 classification result output unit
211 event name information reception unit
212 event feature information reception unit
213 sample image reception unit
214 sample image writing unit
231 image storage unit
232 image feature information storage unit
233 family scene information storage unit
234 event feature information storage unit
236 sample image storage unit

The invention claimed is:

1. An image data processing device that calculates image feature information for classifying images, comprising:
   a face specification unit configured to specify a face region included in an image;
   an image feature calculation unit configured to calculate image feature information for the image from an image feature calculated based on at least some pixels in the image; and
   an image group feature calculation unit configured to calculate image group feature information for classifying an image group based on the image feature information for each of two or more images belonging to the image group, wherein
   the face specification unit is further configured to calculate face area information indicating an area ratio of the face region to the entire image, and
   when the area ratio indicated by the face area information for a first image is smaller than the area ratio indicated by the face area information for a second image, the image group feature calculation unit calculates the image group feature information such that the image feature information for the first image is reflected in the image group feature information more than the image feature information for the second image.

2. The image data processing device of claim 1, wherein the image feature information is calculated from the image feature calculated based on pixels other than pixels in the face region and pixels not in a given region around the face region.

3. The image data processing device of claim 2, wherein the face region is a rectangular region that includes a face and is defined by horizontal and vertical lines in the image, and the given region is an expanded face region that is rectangular and is obtained by expanding the face region at least upwards, rightwards and leftwards in the image according to a predetermined algorithm.

4. The image data processing device of claim 1 further comprising
a body specification unit configured to specify, as a body region, a region positioned below the face region and determined relative to the face region according to a predetermined algorithm, wherein
the image feature information is calculated such that the image feature calculated based on pixels in the body region is reflected in the image feature information more than the image feature calculated based on pixels other than the pixels in the body region.

5. The image data processing device of claim 4, wherein
the image feature information is calculated from the image feature calculated based only on the pixels in the body region.

6. The image data processing device of claim 4, wherein
the body region includes an expanded body region obtained by removing the face region from a region obtained by expanding the body region at least upwards, rightwards and leftwards in the image according to a predetermined algorithm.

7. The image data processing device of claim 4, wherein
when the body specification unit specifies first and second body regions included in an image, the image feature information is calculated from the image feature calculated based on pixels in at least one of the first and second body regions.

8. The image data processing device of claim 1, wherein
when the face specification unit specifies first and second face regions included in an image, the image feature information is calculated from the image feature calculated based on pixels other than pixels in the first face region, pixels in the second face region and pixels not in at least one of a given region around the first face region and a given region around the second face region.

9. The image data processing device of claim 1 further comprising
an image group classification unit configured to classify the image group into one of a plurality of categories, wherein
the image group is classified based on reference information indicating, for each of the categories, a range of a feature indicated by the image group feature information, and the image group feature information.

10. The image data processing device of claim 9, wherein
the image feature information includes information relating to a color included in the image,
the image group feature information includes information relating to a color included in images belonging to the image group,
the reference information includes color reference information indicating, for each of the categories, a range of a color feature indicated by the image group feature information, and
the image group is classified based on the color reference information and the information relating to a color included in the image group feature information.

11. The image data processing device of claim 1, wherein
the image feature information is calculated such that the image feature calculated based on pixels in a given region around the face region is reflected in the image feature information more than the image feature calculated based on pixels other than the pixels in the given region.

12. An image data processing method implemented by using an image data processing device that calculates image feature information for classifying images, the image data processing method comprising:
a face specification step of specifying a face region included in an image;
an image feature calculation step of calculating image feature information for the image from an image feature calculated based on at least some pixels in the image; and
an image group feature calculation step of calculating image group feature information for classifying an image group based on the image feature information for each of two or more images belonging to the image group, wherein
the face specification step further calculates face area information indicating an area ratio of the face region to the entire image, and
when the area ratio indicated by the face area information for a first image is smaller than the area ratio indicated by the face area information for a second image, the image group feature calculation step calculates the image group feature information such that the image feature information for the first image is reflected in the image group feature information more than the image feature information for the second image.

13. An image data processing program, stored on a non-transitory computer-readable medium, that causes a computer to function as an image data processing device that calculates image feature information for classifying images, the image data processing program comprising:
a face specification unit configured to specify a face region included in an image;
an image feature calculation unit configured to calculate image feature information for the image from an image feature calculated based on at least some pixels in the image; and
an image group feature calculation unit configured to calculate image group feature information for classifying an image group based on the image feature information for each of two or more images belonging to the image group, wherein
the face specification unit is further configured to calculate face area information indicating an area ratio of the face region to the entire image, and
when the area ratio indicated by the face area information for a first image is smaller than the area ratio indicated by the face area information for a second image, the image group feature calculation unit calculates the image group feature information such that the image feature information for the first image is reflected in the image group feature information more than the image feature information for the second image.

14. A semiconductor integrated circuit that calculates image feature information for classifying images, comprising:
a face specification unit configured to specify a face region included in an image;
an image feature calculation unit configured to calculate image feature information for the image from an image feature calculated based on at least some pixels in the image; and
an image group feature calculation unit configured to calculate image group feature information for classifying an image group based on the image feature information for each of two or more images belonging to the image group, wherein the face specification unit is further configured to calculate face area information indicating an area ratio of the face region to the entire image, and when the area ratio indicated by the face area information for a first image is smaller than the area ratio indicated by the face area information for a second image, the image group feature calculation unit calculates the image group feature information such that the image feature information for the first image is reflected in the image group feature information more than the image feature information for the second image.

* * * * *